(12) United States Patent
Takahashi et al.

(10) Patent No.: US 10,790,734 B2
(45) Date of Patent: Sep. 29, 2020

(54) ROTATING ELECTRIC MACHINE

(71) Applicant: DENSO CORPORATION, Kariya, Aichi-pref. (JP)

(72) Inventors: Yuki Takahashi, Kariya (JP); Tomokazu Hisada, Kariya (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 16/305,847

(22) PCT Filed: Jun. 1, 2017

(86) PCT No.: PCT/JP2017/020445
§ 371 (c)(1),
(2) Date: Nov. 29, 2018

(87) PCT Pub. No.: WO2017/209246
PCT Pub. Date: Dec. 7, 2017

(65) Prior Publication Data
US 2019/0157954 A1 May 23, 2019

(30) Foreign Application Priority Data

Jun. 3, 2016 (JP) .................................. 2016-112278
Apr. 28, 2017 (JP) .................................. 2017-089433

(51) Int. Cl.
H02K 21/04 (2006.01)

(52) U.S. Cl.
CPC ....... H02K 21/044 (2013.01); *H02K 2213/03* (2013.01)

(58) Field of Classification Search
CPC ...... H02K 21/00; H02K 21/04; H02K 21/044; H02K 21/14; H02K 1/00; H02K 1/22;
(Continued)

(56) References Cited

U.S. PATENT DOCUMENTS 6,020,669 A * 2/2000 Umeda .................. H02K 1/243
310/263
6,097,130 A * 8/2000 Umeda .................. H02K 1/243
310/263

(Continued)

FOREIGN PATENT DOCUMENTS

JP H04-255451 A 9/1992

*Primary Examiner* — Tran N Nguyen
(74) *Attorney, Agent, or Firm* — Oliff PLC

(57) ABSTRACT

A rotor of a rotating electric machine includes a field core having a cylindrical boss portion, and a plurality of claw-shaped magnetic pole portions that are arranged on the outer side of the boss portion and form poles of alternately different polarities in the circumferential direction, a field winding that is wound around the outer periphery of the boss portion and generates a magnetomotive force by energization, a permanent magnet disposed between the circumferentially adjacent claw-shaped magnetic pole portions so as to have its easy axis of magnetization oriented in the circumferential direction and have its polarity coincide with the polarity of the claw-shaped magnetic pole portions which alternately appears by excitation, and a magnetic flux short circuit member having a short circuit portion that magnetically connects the claw-shaped magnetic pole portions circumferentially arranged to have different polarities.

12 Claims, 15 Drawing Sheets

(58) Field of Classification Search
CPC .......... H02K 1/226; H02K 1/24; H02K 19/00; H02K 19/22; H02K 19/24
See application file for complete search history.

(56) References Cited

U.S. PATENT DOCUMENTS

| | | | | |
|---|---|---|---|---|
| 6,127,763 | A * | 10/2000 | Nakamura | H02K 9/06 310/216.097 |
| 6,531,802 | B2 * | 3/2003 | Umeda | H02K 1/243 310/263 |
| 2002/0135265 | A1 | 9/2002 | Umeda | |
| 2009/0066175 | A1 * | 3/2009 | Morita | H02K 9/06 310/58 |
| 2009/0152979 | A1 | 6/2009 | Isogai | |
| 2010/0207476 | A1 * | 8/2010 | Yoshizawa | H02K 21/044 310/156.12 |
| 2013/0187515 | A1 * | 7/2013 | Ishikawa | H02K 1/243 310/263 |

* cited by examiner $AbBs = BrAm$

Ab: CROSS-SECTIONAL AREA OF BOSS
Bs: BOSS B50
Am: SURFACE AREA OF PERMANENT MAGNET AT MAGNETIC FLUX INFLOW/OUTFLOW SURFACE
Br: MAGNET RESIDUAL FLUX DENSITY

PREMISE FOR CALCULATION (AbBs+AsBs=BrAm)

ROTATING ELECTRIC MACHINE

CROSS-REFERENCE TO RELATED APPLICATION

This application is the U.S. national phase of International Application No. PCT/JP2017/020445 filed Jun. 1, 2017 which designated the U.S. and claims priority to Japanese Patent Application No. 2016-112278 filed Jun. 3, 2016, and Japanese Patent Application No. 2017-89433, filed Apr. 28, 2017, the contents of which are incorporated herein by reference.

TECHNICAL FIELD

The present disclosure relates to a rotating electric machine for use as an electric motor or a generator mounted on, for example, an automobile or a truck.

BACKGROUND ART

Conventional rotating electric machines are known that include a Lundell-type rotor having a field winding for generating a magnetomotive force by energization and a plurality of claw-shaped pole pieces in which NS magnetic poles are alternately excited along a circumferential direction of rotation by the magnetomotive three of the field winding. PTL 1 and 2 each discloses a vehicle alternator in which permanent magnets are interposed between claw-shaped pole pieces adjacent in the circumferential direction to increase the effective magnetic flux of a magnetic circuit excited by a field winding.

PTL 1 discloses that the residual flux density Br of the permanent magnets can be uniformly determined by determining the constants L, W, and θ using a mathematical expression derived by determining the relationship between the permanent magnet magnetic flux causing the inflection point of the output characteristics of the generator and the constants L, W, and θ of the claw-shaped pole pieces. This allows magnetic poles to be set that avoid overcharging of a battery while achieving high efficiency and high output even if the specifications are different.

PTL 2 discloses that a magnetic pole cylindrical member (magnetic flux short circuit member) disposed on the outer side of claw-shaped pole pieces is provided, and protrusions corresponding to the contour of the claw-shaped pole pieces and recesses corresponding to the gaps between adjacent claw-shaped pole pieces are provided on the outer diameter surface of the magnetic flux short circuit member. PTL 2 also describes connecting the protrusions and recesses in a slope shape.

CITATION LIST

Patent Literature

[PTL 1] JP 1992-255451 A
[PTL 2] JP 2009-148057 A

SUMMARY OF THE INVENTION

As described in PTL 2, when the magnetic flux short circuit member is provided on the outer side of the claw-shaped pole pieces of the rotor, the eddy current decreases to improve reliability, but the magnetic flux between the N pole and the S pole of the adjacent claw-shaped pole pieces is short circuited by the magnetic flux short circuit member, resulting in lower outputs. In addition, although not suggested in PTL 2, in the rotor formed of magnets and claw-shaped pole pieces, the amount of radially outward deformation of the claw-shaped pole pieces due to the centrifugal force increases by the weight of the magnets added. Therefore, the air gap between the stator and the rotor needs to be widen so as to allow the air gap therebetween to be equivalent to that in the case of rotors with no magnets even when the centrifugal force causes the largest amount of deformation. However, widening the air gap increases the magnetoresistance and thus reduces the capability of magnetic flux generation due to the field current of the rotor.

PTL 1 discloses a Lundell-type generator with magnets, but does not describe any influence of the centrifugal three on the permanent magnets and claw-shaped magnetic pole pieces and any countermeasure for this.

One way to solve the ahovementioned problems is to thicken a base portion of a claw-shaped pole piece to prevent the expansion thereof in a Lundell-type rotor with magnets. This approach, however, does not provide optimum dimensions for magnetic circuits, thus reducing the amount of output. Therefore, it is preferable to reinforce the outer peripheral surface of the claw-shaped pole pieces with a magnetic flux short circuit member as disclosed in PTL 2 without expanding the air gap between the stator and the rotor. However, this technique involves a factor in reducing the amount of output compared to the configuration of PTL 1 as described in PTL 2, and thus has not been into practical use.

The rotor needs to be kept from contact with the stator by the air gap described above while allowing perturbations generated in the rotating shaft. The air gap is designed taking into account the deformation of the rotor itself due to disturbances and centrifugal forces. In a configuration that suppresses the influence of disturbances using a ball bearing, the deformation of claw-shaped pole pieces is considered in particular. Therefore, to add the weight of magnets between claw-shaped magnetic pole pieces while maintaining the reliability, it is necessary to make the air gap in a Lundell-type rotor with magnets larger than in a Lundell-type rotor with no magnets. Accordingly, the field current needs to be large, which increases copper losses, leading to increased heat generation. The amount of deformation can be reduced by increasing the cross-sectional area of disc portions of the rotor. This approach, however, reduces a space for the field winding, thus increasing heat generation due to an increase in the DC resistance value, and reducing ease of mounting due to an increase in the axial dimensions.

Conventionally, if the magnetic flux generated in the boss portions of the rotor due to excitation of a field winding is designed to be guided from the disc portions to the claw-shaped pole pieces, the magnetic characteristics are made constant or gradually reduced from the boss portions to the claw-shaped pole pieces taking magnetic flux leakage into consideration using the cross-sectional area of a part of the rotor as a reference. In such a design, it can be easily assumed that the weight of the magnets is about 0.3 to 0.7 times the weight of the claw-shaped pole pieces, and that the weight of the claw-shaped pole pieces of Lundell-type rotors with magnets does not greatly deviate from the range of weights 1.3 to 1.7 times that of conventional ones. Therefore, unless the air gap is designed to be of about 0.37 to 0.52 mm in contrast to 0.25 to 0.35 mm, which is the size of typical air gaps of current products, a Lundell-type rotor with magnets that has good dimensions for magnetic circuits of conventional products cannot be produced with the same reliability in strength as that of conventional products.

FIG. 25 is a diagram in which the horizontal axis represents the ampere turn (AT), which is the unit of the magnetomotive force, and the vertical axis represents the field characteristics of the rotating electric machine when the air gap is 0.3 mm and 0.4 mm. As can be seen from FIG. 25, widening the air gap from 0.3 mm to 0.4 mm conventionally requires the field capacity to be improved by 40%. In addition, since the field capacity is designed in accordance with the ability of current brushes, it may be difficult to use the magnetic flux equivalent to that of a conventional Lundell-type rotor with no magnets in a range of currents in which continuous rating is possible from the viewpoint of the ability of the brushes to resist heat. Even if the brushes withstand heat, the amount of heat generated by copper losses increases by 92% due to an increase in the inflow current to a field winding as shown in FIG. 26, thereby necessitating a review of the cooling.

It is an object of the present disclosure to provide a rotating electric machine capable of securing sufficient reliability in strength while suppressing expansion of an air gap, achieving high output by improving field characteristics and maximum magnetic flux, and securing thermal reliability by reducing the amount of heat generated by a field winding.

According to a first aspect of the present disclosure, in a rotating electric machine including a stator having a stator core wound with an armature winding, and a rotor disposed on the inner side of the stator so as to face the stator in the radial direction. The rotor includes a field core having a cylindrical boss portion and a plurality of claw-shaped magnetic pole portions that are disposed on the outer side of the boss portion and form poles of alternately different polarities in the circumferential direction, a field winding that is wound around the outer periphery of the boss portion and generates a magnetomotive force by energization, a permanent magnet disposed between the circumferentially adjacent claw-shaped magnetic pole portions so as to have its easy axis of magnetization oriented in the circumferential direction and have its polarity coincide with the polarity of the claw-shaped magnetic pole portions which alternately appears by excitation, and a magnetic flux short circuit member having a short circuit member that magnetically connects the claw-shaped magnetic pole portions circumferentially arranged to have different polarities.

The rotor is configured to satisfy Ab·Bsb+ As·Bss≥2·Br·Am and 0.03≤As/Ab≤0.22, where Ab is the axial cross-sectional area of the boss portion per a pair of NS magnetic poles, Bsb is the magnetic flux density of the material of the boss portion at a magnetic field strength of 5000 A/m, Br is the residual flux density of the permanent magnet, Am is the surface area of the permanent magnet at magnetic flux inflow/outflow surfaces, As is the circumferential cross-sectional area of the short circuit member, and Bss is the magnetic flux density of the material of the short circuit member at a magnetic field strength 5000 A/m.

According to this configuration, when the field magnetic flux is excited by the field core upon energization of the field winding, the magnetic flux flowing through the boss portion wound with the field winding becomes saturated, so that the magnetic force ψm of the permanent magnet can flow out to the stator. Therefore, the magnetic force ψm of the permanent magnet allows a magnetic three to be increased by an amount greater than or equal to a decrease in the capability of a short circuit portion, provided between conventional claw-shaped magnetic pole portions, due magnetic flux leakage. Consequently, the field characteristics and the maximum magnetic flux can be set high, leading to high output.

The magnetic flux short circuit member is disposed on the outer side or the inner side of claw-shaped magnetic pole portions, or in a space excluding the area of permanent magnet, located between claw-shaped magnetic pole portions having circumferentially arranged to have different polarities. If the magnetic flux short circuit member is disposed on the outer side of the claw-shaped magnetic pole portions, the resistance of the claw-shaped magnetic pole portions to the centrifugal force increases in radial directions. This suppresses the claw-shaped magnetic pole portions from expanding radially outward by the centrifugal force. Therefore, the air gap between the stator and the rotor can have the same size as for conventional Lundell-type rotors with no magnets, which constitute a majority of rotors distributed. Consequently, sufficient reliability in strength is secured while the expansion of the air gap is suppressed. In addition, the smaller air gap lowers the field current flowing through the field winding, thus reducing the amount of heat generated by the field winding as compared with conventional Lundell-type rotors with magnets. Thus, thermal reliability can be achieved with the capability of an existing air-cooling mechanism.

BRIEF DESCRIPTION OF THE DRAWINGS

FIG. 7 shows the relationship between the ampere-turn and the saturation flux for rotating electric machines each having a different combination of the size of an air gap (0.3 mm or 0.4 mm), the presence of a magnet, and the like;

DESCRIPTION OF THE EMBODIMENTS

Figure 7:
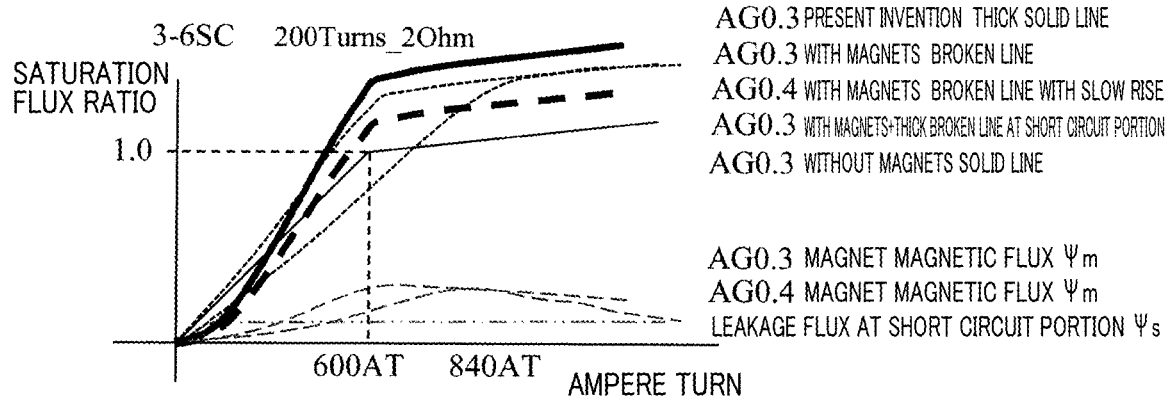

FIG. 7 shows the relationship between the ampere-turn and the saturation magnetic flux for rotating electric machines each having a different combination of the size of an air gap (0.3 mm or 0.4 mm), the presence of a magnet, and the like. When a magnetic flux short circuit member is provided on the outer side of claw-shaped magnetic pole pieces of the rotor as in PTL 2, the field characteristics deteriorate as indicated by the change from a thin broken line to a thick broken linen in FIG. 7; this is the idea based on the existing technology. This idea is the source of the idea that the dimensions between the claw-shaped pole pieces of the flux short circuit member should be the smallest possible. That is, the idea is that the flux linkage to the armature winding decreases by an amount of the magnetic flux leaking to the magnetic flux short circuit member.

As a field boss portion is becoming saturated, the magnetic resistance on the boss portion side increases, where the magnetic force ψm easily flows out to the stator side, thus drawing a curved line. After the boss portion becomes saturated, demagnetization occurs by the demagnetizing field due to the field current AT, and the effective magnetic flux density Bd decreases. In FIG. 7, the number of magnets is set as Ab·Bs=2·Br·Am so as to prevent, under no load, the magnetic flux of the magnets from being guided to the stator side, and the battery from being overcharged. Here, Ab is the cross-sectional area of a boss portion, Bs is a boss portion B50, Am is the surface area of permanent magnets at magnetic flux inflow/outflow surfaces, and Br is the residual flux density of the magnets. The cross-sectional area Ab of a boss portion is a value obtained by dividing the cross-sectional area of the overall boss portion by the number of pairs of poles in the rotor. For the magnetic field of the disclosed rotating electric machine, a value of B50 is adopted as Bs instead of the saturation magnetic flux density, because neodymium magnets are assumed to be used that have a coercive force of about 100 kA/m, which changes with temperature, with respect to a thickness of 5 to 10 mm of the magnets. It should be noted that a magnetic flux value of B50 is typically only about 10% different from Bs if it is electromagnetic soft iron, and can be applied with a small error in most cases.

Here, a short circuit portion as a magnetic member is added in front of an air gap with respect to the stator to reduce the magnetoresistance effectively so as to promote saturation of the boss portion. Therefore, since the boss portion becomes more saturated than the stator as compared with PTL 1, the stator has a lower magnetoresistance than the rotor. As a result, the peak point of the magnet magnetic force ψm is reached with a low energization electric field=demagnetizing field, and thus should be high. The inventors of the present invention have conducted research in this respect, and the present invention has been made as a result of tenaciously examining the relationship between an increase in the magnetoresistance of the boss portion and the cross-sectional area of the short circuit portion.

Embodiments of the rotating electric machine according to the present invention will now be described in detail with reference to the drawings.

First Embodiment

The rotating electric machine according to the first embodiment will be described with reference to FIGS. 1 to 11, 19, and 20. The rotating electric machine according to the first embodiment is a vehicle alternator mounted on a vehicle and used as a generator.

<Overall Configuration of Vehicle Alternator>

Figure 1:
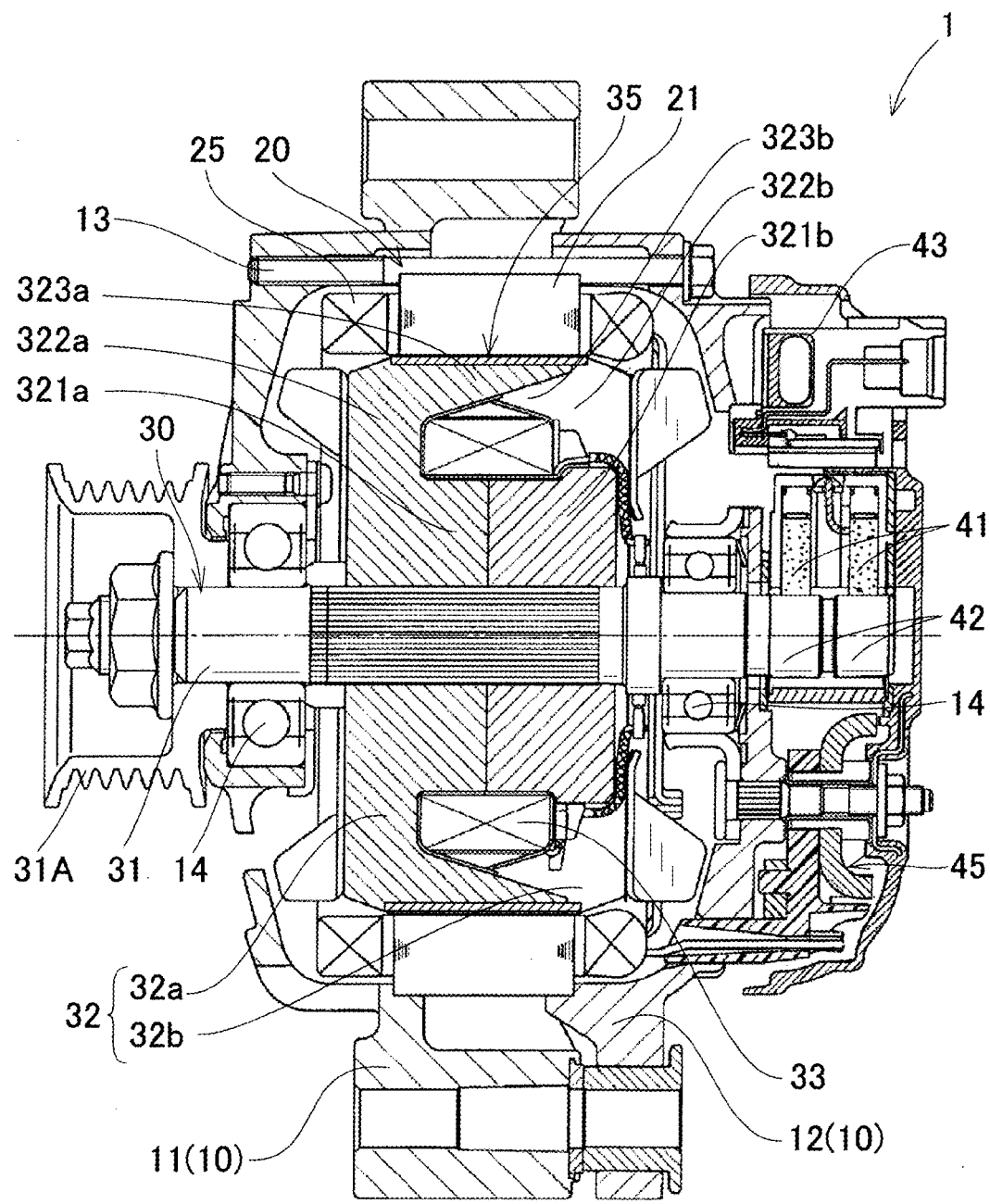
FIG. 1 is an axial cross-sectional view of a rotating electric machine according to a first embodiment.

As shown in FIG. 1, a vehicle alternator 1 of the first embodiment includes a housing 10, a stator 20, a rotor 30, a field winding power supply device, a rectifier 45, and the like. The housing 10 includes a front housing 11 having a cylindrical shape with a closed-bottom and a rear housing 12, each having an open end. The front housing 11 and the rear housing 12 are fastened by bolts 13, with the open portions joined to each other.

Figure 19:
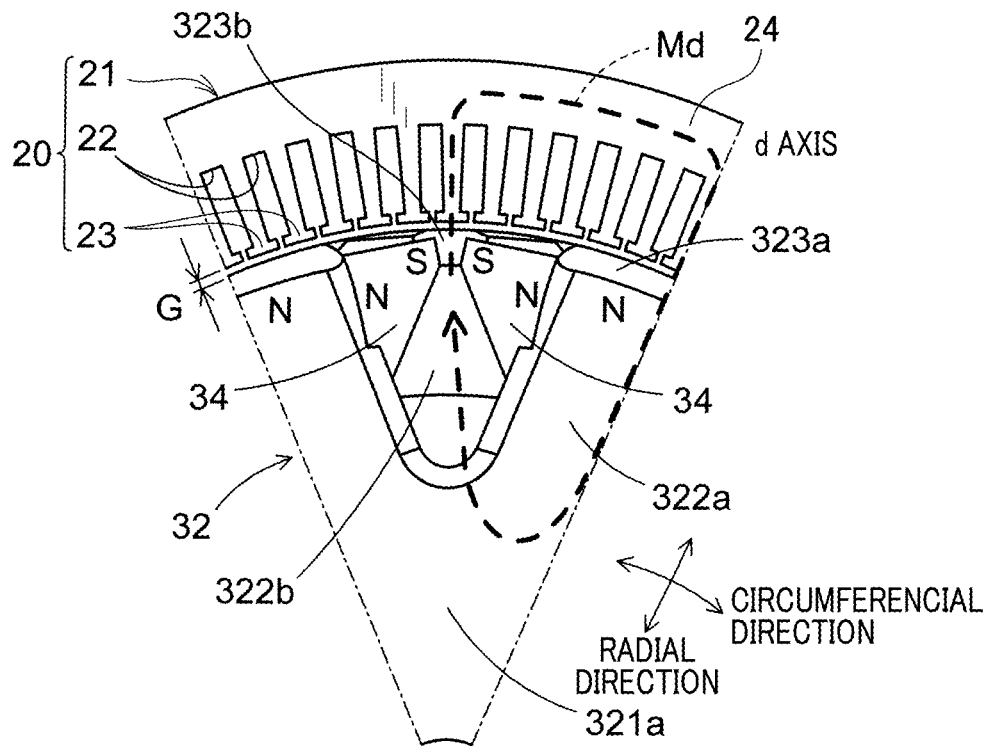
FIG. 19 is a partial plan view illustrating a magnetic circuit of a d-axis.
Figure 20:
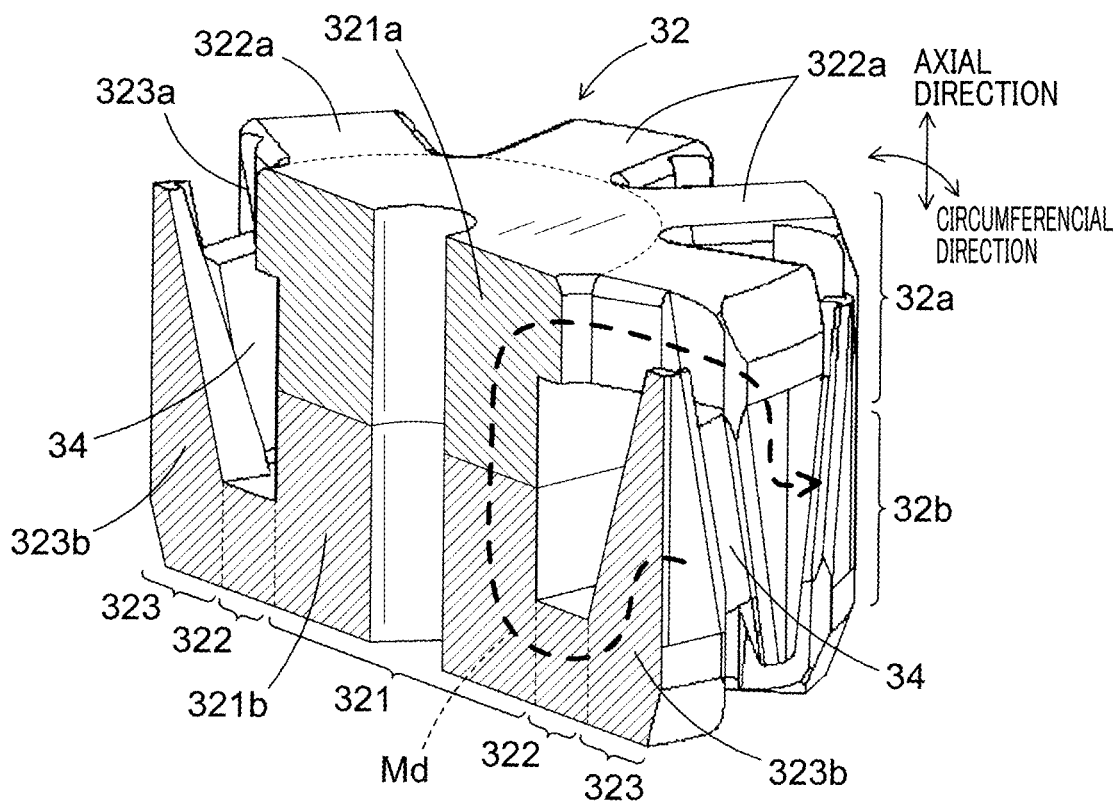
FIG. 20 is a perspective cross-sectional and perspective view illustrating a magnetic circuit of a d-axis.

The stator 20 includes an annular stator core 21 having a plurality of slots 22 and a plurality of teeth 23 shown in FIGS. 19 and 20 arranged in the circumferential direction, and armature windings 25 formed of three-phase windings wound in the slots 22 of the stator core 21. The plurality of teeth 23 extend radially from the stator core 21. The plurality of slots 22 are spaces formed between circumferentially adjacent teeth 23, and accommodate the armature windings 25. The stator 20 is sandwiched in the axial direction between the inner surfaces of the peripheral walls of the front housing 11 and the rear housing 12 so as to be fixed therebetween.

Figure 2:
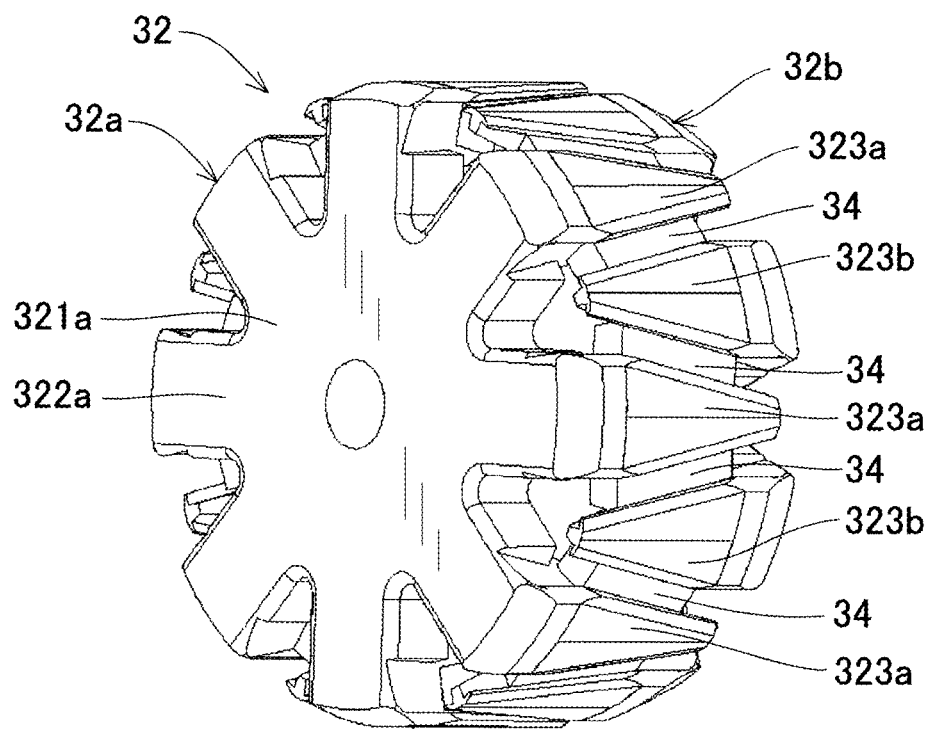
FIG. 2 is a perspective view of a rotor with a magnetic flux short circuit member removed, according to the first embodiment.
Figure 3:
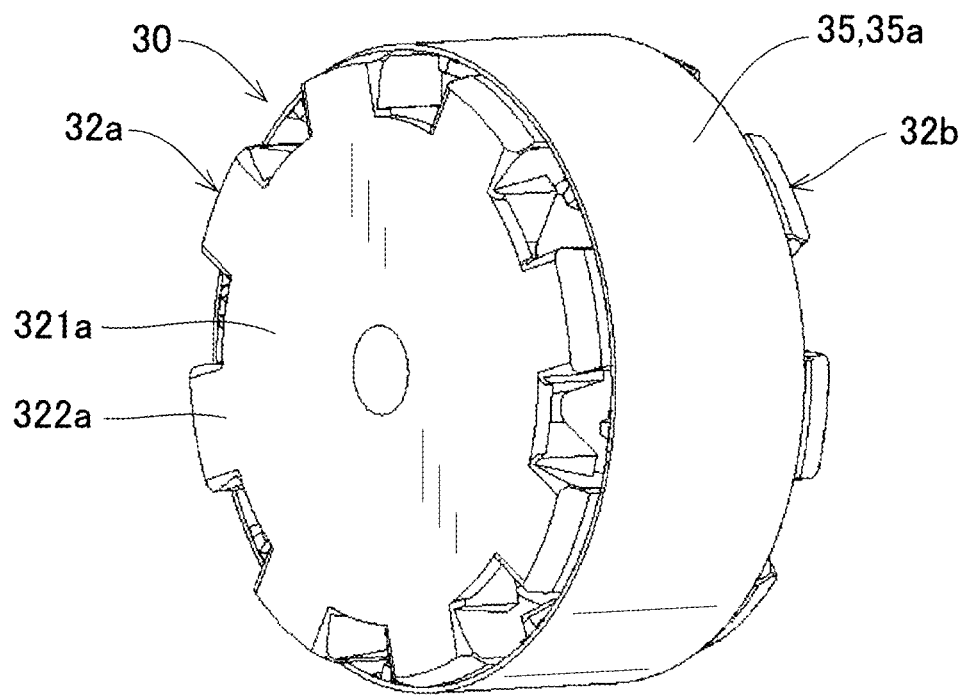
FIG. 3 is a perspective view of the rotor with the magnetic flux short circuit member, according to the first embodiment.
Figure 4:
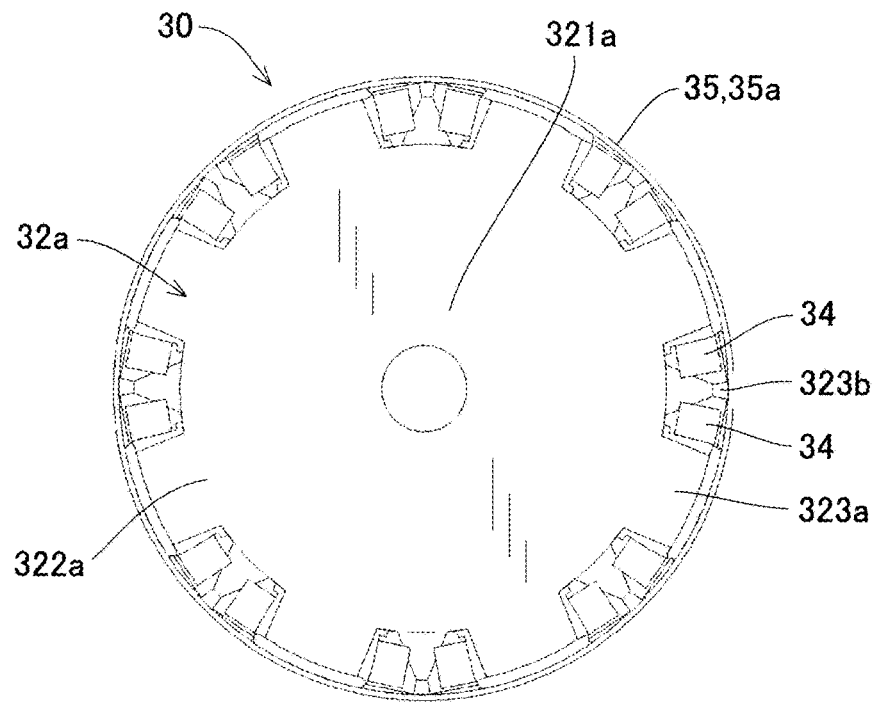
FIG. 4 is a front view of the rotor as viewed in the axial direction thereof, according to the first embodiment.

As shown in FIGS. 2, 3, and 4, the rotor 30 includes a rotating shaft 31 (FIG. 1), a Lundell-type field core 32, and a plurality of permanent magnets 34. The rotating shaft 31 is rotatably supported by the housing 10 via a pair of bearings 14. The field core 32 is formed of a pair of pole cores 32a and 32b fitted and secured to the outer periphery of the rotating shaft 31. The field winding 33 is wound around the boss portions 321 (321a and 321b) of the field core 32. The permanent magnets 34 are disposed between the field winding 33 and circumferentially adjacent claw-shaped magnetic pole portions 323 of the field core 32. The rotor 30 is rotatably provided on the inner side of the stator 20 so as to face the stator in the radial direction. The rotor 30 is rotationally driven by an engine (not shown) mounted on a vehicle via a pulley 31A secured to a front end portion of the rotating shaft 31. The boss portion 321 corresponds to the "core portion" according to the present embodiment.

As shown in FIGS. 1 and 2, the field core 32 is formed of a first pole core 32a secured to the front side (the left side in FIG. 1) of the rotating shaft 31 and a second pole core 32b secured to the rear side (the right side in FIG. 1) of the rotating shaft 31. The first pole core 32a includes a cylindrical first boss portion 321a, a first disc portion 322a, and first claw-shaped magnetic pole portions 323a. The first boss portion 321a allows the field flux to flow in the axial direction radially inside the field winding 33. The first disc portion 322a extends radially outward from the front end portion in the axial direction of the first boss portion 321a with a predetermined pitch in the circumferential direction so as to allow the field flux to flow in the radial direction. The first claw-shaped magnetic pole portions 323a extend axially from the distal ends of the first disc portion 322a so as to surround the field winding 33, and exchange magnetic flux with the stator core 21.

The second pole core 32b has the same shape as the first pole core 32a, and includes a second boss portion 321b, a second disc portion 322b, and second claw-shaped magnetic pole portions 323b. The first and second pole cores 32a and 32b are made of a soft magnetic material.

The first pole core 32a and the second pole core 32b are assembled such that the first claw-shaped magnetic pole portions 323a and second claw-shaped magnetic pole portions 323b face in alternate directions with the axial rear end surface of the first pole core 32a and the axial front end surface of the second pole core 32b in contact with each other. Thus, the first claw-shaped magnetic pole portions 323a of the first pole core 32a and the second claw-shaped magnetic pole portions 323b of the second pole core 32b are alternately arranged circumferentially. The first and second pole cores 32a and 32b each have eight claw-shaped magnetic pole portions 323, forming a 16-pole (N-pole: 8, S-pole: 8) Lundell-type rotor core in the first embodiment.

The field winding 33 is wound around the outer peripheral surfaces of the first and second boss portions 321a, 321b while being electrically insulated from the field core 32, and are surrounded by the first and second claw-shaped magnetic pole portions 323a, 323b. The field winding 33 generates a magnetomotive force in the boss portion 321 with the passage of a field current If from a field current control circuit (not shown). Thus, magnetic poles of different polarities are formed in the first claw-shaped magnetic pole portions 323a and the second claw-shaped magnetic pole portions 323b of the first and second pole cores 32a and 32b, respectively. In the first embodiment, the first claw-shaped magnetic pole portions 323a are magnetized to the S pole, and the second claw-shaped magnetic pole portions 323b are magnetized to the N pole.

In this case, the magnetic flux generated in the boss portion 321 of the field core 32 by the field winding 33 forms a magnetic circuit where the magnetic flux flows from the first boss portion 321a of the first pole core 32a to the first disc portion 322a and to the first claw-shaped magnetic pole portions 323a, flows from the first claw-shaped magnetic pole portions 323a to the second claw-shaped magnetic pole portions 323b of the second pole core 32b via the stator core 21, and then returns to the first boss portion 321a from the second claw-shaped magnetic pole portions 323b via the second disc portion 322b and the second boss portion 321b. This magnetic circuit generates a counter electromotive force of the rotor 30.

Figure 6:
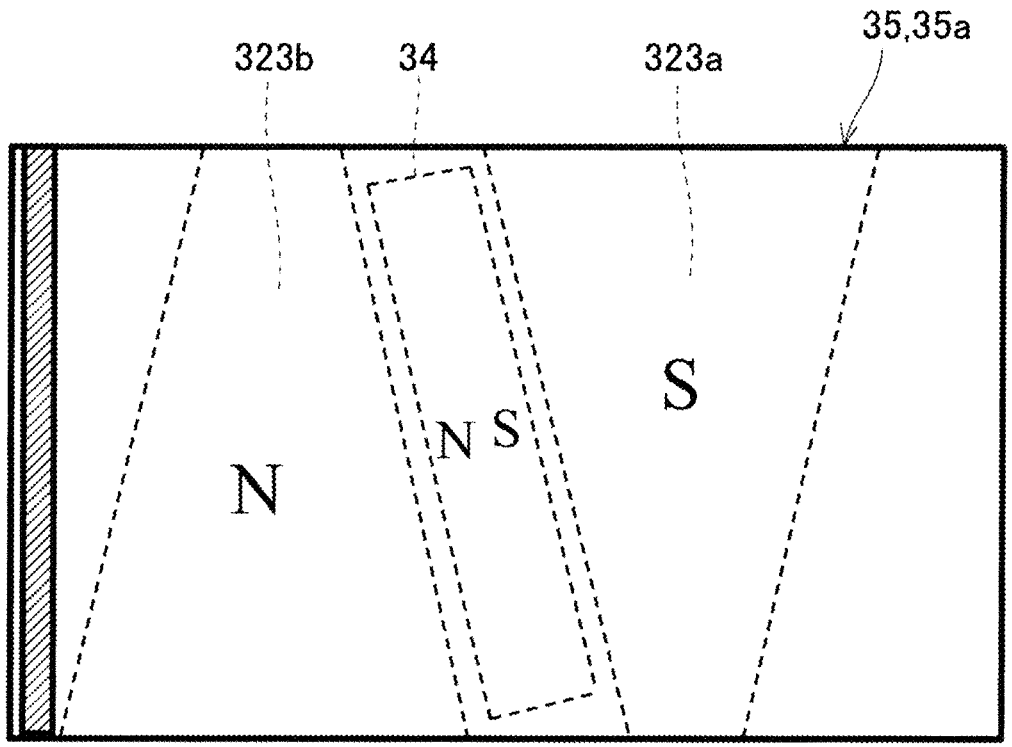
FIG. 6 illustrates a part of the magnetic flux short circuit member of the rotor, which is developed in a circumferential direction, according to the first embodiment.

As shown in FIG. 2, gaps extending in directions inclined from the axial direction are formed between the first claw-shaped magnetic pole portions 323a and the second claw-shaped magnetic pole portions 323b alternately arranged in the circumferential direction, with one permanent magnet 34 disposed in each gap. Each permanent magnet 34 has a rectangular parallelepiped outer shape, with their easy axis of magnetization oriented in the circumferential direction. In addition, the permanent magnets 34 are held by the first and second claw-shaped magnetic pole portions 323a, 323b with end surfaces of the permanent magnets 34 on both sides in the circumferential direction, that is, magnetic flux inflow/outflow surfaces, being in contact with the circumferential side surfaces of the first and second claw-shaped magnetic pole portions 323a, 323b. Thus, the permanent magnets 34 are arranged to have their polarity coincide with the polarity of first and second claw-shaped magnetic pole portions 323a, 323b which alternately appears due to the excitation of the field winding 33, as shown in FIG. 6.

Figure 5:
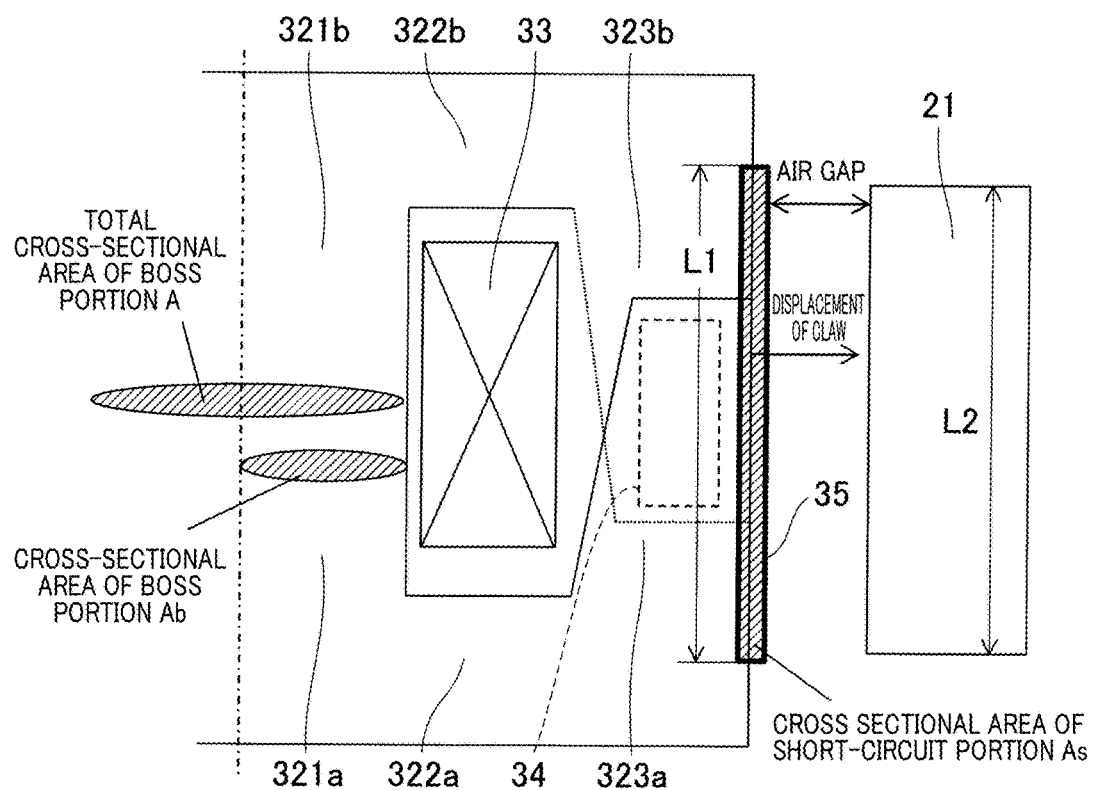
FIG. 5 illustrates the dimensions of a field core, according to the first embodiment.

As shown in FIGS. 3 to 6, the magnetic flux short circuit member 35 is formed of a soft magnetic material in a hollow cylindrical shape having a constant axial cross-sectional area (wall thickness) in the circumferential direction (see FIG. 4), and is fitted and secured to the outer side of the field core 32 so as to be in contact with the outer surface of the claw-shaped magnetic pole portions 323. That is, the magnetic flux short circuit member 35 has a short circuit portion 35a that magnetically connects circumferentially and alternately arranged claw-shaped magnetic pole portions 323 of different polarities. In the first embodiment, as shown in FIG. 5, the magnetic flux short circuit member 35 has an axial length L1 greater than the axial length L2 of the stator core 21, and the short circuit portion 35a has the axial length L1. Thus, the short circuit portion 35a is provided so that both axial ends protrude axially outward from the radially facing surfaces of the rotor 30 and the stator core 21. The axial cross-sectional area As of the short circuit portion 35a is constant in the circumferential direction. That is, the short circuit portion 35a is not provided with projections and recesses or holes with which the thickness thereof varies in the circumferential direction. To reduce the counter electromotive force, the short circuit portion 35a may be made of a material having a higher relative permeability than the field core 32 (in particular, the boss portion 321).

As shown in FIG. 1, the field winding power supply device supplies power to the field winding 33, and includes a pair of brushes 41, a pair of slip rings 42, a regulator 43, and the like. The pair of slip rings 42 are fitted and secured to one axial end (the right end in FIG. 1) of the rotating shall 31. The pair of brushes 41 are slidably disposed with their radially inner ends pressed against the surface of the slip rings 42. The pair of brushes 41 supply power to the field winding 33 via the slip rings 42. The regulator 43 is a device for adjusting the output voltage of the vehicle alternator 1 by controlling the field current If flowing through the field winding 33. The rectifier 45 is electrically connected to the armature windings 25 and rectifies an alternating current outputted from the armature windings 25 into a direct current. The rectifier 45 includes a plurality of diodes (rectifying elements).

In the vehicle alternator 1 having the above-described configuration, when the rotational force from the engine is transmitted to the pulley 31A via a belt or the like, the rotor 30 rotates with the rotating shaft 31 in a predetermined direction. In this state, with the application of excitation voltages from the brushes 41 to the field winding 33 of the rotor 30 via the slip rings 42, the first and second claw-shaped magnetic pole portions 323a, 323b of the first and second pole cores 32a, 32b are excited, so that NS magnetic poles are alternately formed along the circumferential direction of rotation of the rotor 30. Thus, an alternating electromotive force is generated in the armature windings 25 of the stator 20 upon application of a rotating magnetic field to the armature windings 25. The alternating electromotive force generated in the armature windings 25 is supplied to a battery (not shown) after being rectified to a direct current through the rectifier 45.

A characteristic configuration of the vehicle alternator 1 according to the first embodiment will now be described. In the vehicle alternator 1 configured as described above, the relationship Ab·Bsb+As·Bss≥Br·Am and 0.03≤As/Ab≤0.22 is satisfied, where Ab (hereinafter "boss portion's cross-sectional area Ab") is the axial cross-sectional area of the boss portion 321 per a pair of NS magnetic poles, Bsb is the magnetic flux density of the material of the boss portion 321 at a magnetic field strength of 5000 A/m, Br is the residual flux density of the permanent magnets 34, Am is the surface area of the permanent magnets 34 at magnetic flux inflow/outflow surfaces, As (hereinafter "short circuit, portion's cross-sectional area As") is the circumferential cross-sectional area of the short circuit portion 35$a$, and Bss is the magnetic flux density of the material of the short circuit portion 35$a$ at a magnetic field strength of 5000 A/m. Note that the boss portion's cross-sectional area Ab is expressed as Ab=A/P, where A is the total cross-sectional area of the cylindrical boss portion 321 and P is the number of paired NS poles, as shown in FIG. 5.

In Ab·Bsb+As·Bss≥2·Br·Am, Ab·Bsb is the magnetic flux flowing through the boss portion 321, As·Bss is the magnetic flux flowing through the short circuit portion 35$a$, and Br·Am is the magnetic flux of one permanent magnet 34. Therefore, the above-mentioned relationship means that the sum of the magnetic flux flowing through the boss portion 321 and the magnetic flux flowing through the short circuit portion 35$a$ is larger than the magnetic flux of the permanent magnet 34.

Figure 8:
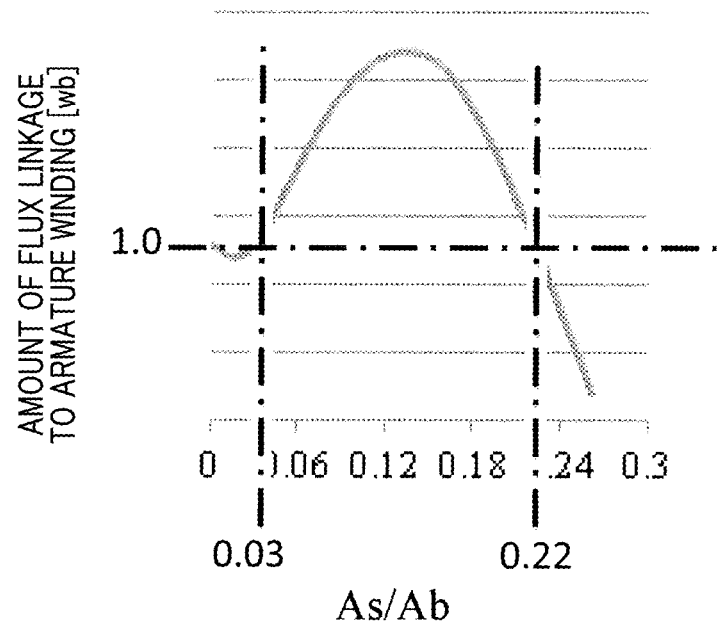
FIG. 8 illustrates the relationship between As/Ab and the amount of flux linkage to the armature winding, according to the first embodiment.

The inventors examined the relationship between (short circuit portion's cross-sectional area As)/(boss portion's cross-sectional area Ab) and the amount of flux linkage to the armature windings 25, and the results are shown in FIG. 8. FIG. 8 shows that the amount of flux linkage to the armature windings 25 does not decrease and is equivalent as compared with the case where the cylindrical components are not provided with As/Ab within the range of 0.03 to 0.22. If the cross-sectional area on the stator 20 side is designed to be constant in the current products, this configuration allows the amount of magnet magnetic flux to be obtained which is equivalent to the amount of magnetic flux reduced when the cylindrical components are provided. Therefore, no notable change occurs in the counter electromotive force constant or inductance due to an increase in the amount of magnetic flux measured from the stator 20. On the other hand, the leakage magnetic flux, which may occur with the conventional techniques, is reduced to zero, and the magnetic flux does not decrease, so that favorable secondary effects can be obtained, such as an increase in intensity due to the annulus, prevention of resonance with the stator excitation current of the claws, and lowering of the wind noise. Here, since the magnetic flux linkage to the armature windings 25 is the sum of the magnet magnetic flux ψn and the field magnetic flux ψm, fewer permanent magnets 34 can be used for cost reduction, and the field magnetic flux ψm can be used by an amount corresponding to a decrease in resistance value. Furthermore, connection to a battery in a low-voltage region, such as 48V or 12V, which is much lower than a 200V to 700V battery of a hybrid vehicle improves the short circuit performance so as to prevent overcharging due to electromotive force (EMF). In addition, as a requisite for FIG. 8, among the cross-sectional area Acb of the stator 20 per one pole and the cross-sectional area A teeth per one pole of the stator 20, the smaller cross-sectional area is defined as Astator. In this case, while Ab×0.5≤Astator≤Ab×1.0 is typical in the conventional techniques, Astator≥1.0 Ab is desirable in the present disclosure.

Figure 9:
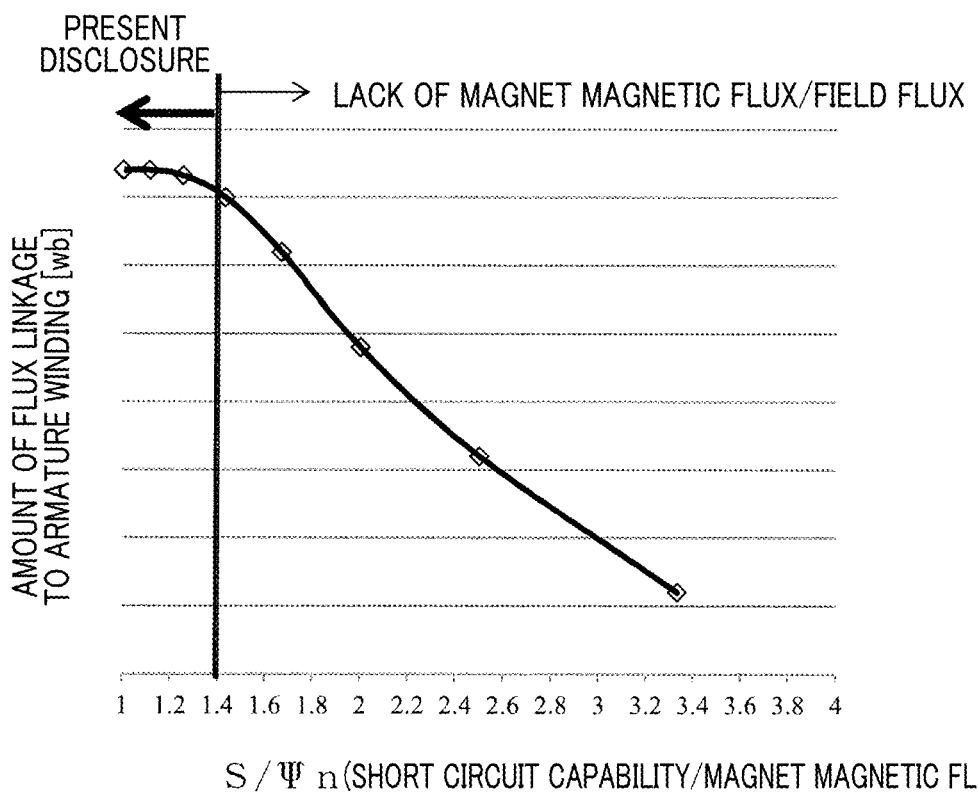
FIG. 9 illustrates the relationship between S/ψn and the amount of flux linkage to the armature winding, according to the first embodiment.

In the vehicle alternator 1 according to the first embodiment, the rotor 30 is configured to satisfy 1≤(Ab·Bsb+As·Bss)/(2·Br·Am)≤1.4. Here, the results shown in FIG. 9 are obtained when As/Ab is fixed at 1.4, which is the peak value of the magnetic flux linkage to the armature windings 25, and S/ψn, where S is a short circuit capability (Bs·Ab+Bs·As) and ψn is the magnet magnetic flux under no load (Br·Am) is taken on the horizontal axis while the amount of the flux linkage to the armature windings 25 is taken on the vertical axis. That is, Ab·Bsb+As·Bss≥2·Br·Am and 0.03≤As/Ab≤0.22 is satisfied, and even in a low voltage range where EMF constraints are severe with S/ψn in the range of 1 to 1.4, EMF conditions are satisfied with high robustness, allowing the amount of flux linkage to the armature windings 25 to be used without reduction thereof.

(Operation and Effect)

According to the vehicle alternator 1 of the first embodiment configured as described above, the rotor 30 is configured to satisfy Ab·Bsb+As·Bss≥2·Br·Am and 0.03≤As/Ab≤0.22. Thus, when the field magnetic flux is excited by the field core 32 due to energization of the field winding 33, the magnetic flux flowing through the boss portion 321 wound with the field winding 33 becomes saturated, so that the magnetic force ψm of the permanent magnets 34 flows out to the stator 20. Therefore, the magnetic force ψm of the permanent magnets 34 allows a magnetic force to be increased by an amount higher than a decrease in the capability of a short circuit portion, provided between conventional claw-shaped magnetic pole portions, due to magnetic flux leakage. This achieves high output as a result of improving field characteristics and maximum magnetic flux.

Furthermore, in the first embodiment, since the cylindrical magnetic flux short circuit member 35 is disposed on the outer side of the claw-shaped magnetic pole portions 323, the resistance of the claw-shaped magnetic pole portions 323 with respect to the centrifugal force is high enough to suppress the claw-shaped magnetic pole portions 323 from expanding radially outward due to the centrifugal force. Therefore, the air gap between the stator 20 and the rotor 30 can have the same size as for conventional Lundell-type rotors with no magnets, which constitute a majority of rotors distributed. Consequently, sufficient reliability in strength is accomplished while the expansion of the air gap is suppressed.

Furthermore, in the first embodiment, since the smaller air gap reduces the field current flowing through the field winding 33, the field winding 33 generates less heat than in the case of conventional Lundell-type rotors with magnets. Thus, thermal reliability can be achieved with the capability of an existing air-cooling mechanism.

In the first embodiment, the claw-shaped magnetic pole portions 323 are restrained with the cylindrical magnetic flux short circuit member 35, so that resonance of the claw-shaped magnetic pole portions 323 is suppressed and thus noise reduced. Furthermore, if the claw-shaped magnetic pole portions 323 are made thinner toward their claw ends, more space is available for winding the field winding 33. The field winding 33 can be additionally wound in this space to hold down the claw-shaped magnetic pole portions 323 from the back side (that is, from the inner side). In that case, vibration of the claw-shaped magnetic pole portions 323 is reduced and thus noise is reduced.

Furthermore, in the first embodiment, the claw-shaped magnetic pole portions 323, which are formed circumferentially (i.e., along the circumferential direction), are covered by the cylindrical magnetic flux short circuit member 35. This configuration improves efficiency by reducing noises generated by the claw-shaped magnetic pole portions 323 cutting through the air therebetween and reducing load torque.

In the first embodiment, the cylindrical magnetic flux short circuit member 35 is disposed closer to the stator 20 than are the claw-shaped magnetic pole portions 323 so as to face the inner surface of the stator 20. With this arrangement, the direction of the magnetic flux guided from the axial direction to the stator 20 side by the field winding 33 follows a plane having a normal line as its axis. Consequently, magnetic flux decreases in the axial direction of the stator 20, which is usually formed by stacking electrically insulated electromagnetic steel sheets, thus resulting in smaller eddy current loss.

In the first embodiment, the rotor 30 is configured to satisfy $1 \leq (Ab \cdot Bsb + As \cdot Bss)/(2 \cdot Br \cdot Am) \leq 1.4$. This reduces the counter electromotive force in a low voltage range, and reduces costs with fewer permanent magnets 34 required.

In the first embodiment, since the circumferential cross-sectional area As of the short circuit portion 35a of the magnetic flux short circuiting member 35 is constant in the circumferential direction, the above relational expression set using the circumferential cross-sectional area As of the short circuit portion 35a can be easily derived. In addition, the short circuit portion 35a has no stress concentration coefficient and thus experiences no stress concentration, thus allowing the magnetic flux short circuit member 35 to have sufficient strength.

In the first embodiment, the short circuit portion 35a has at least a part thereof protruding axially outward from the radially facing surfaces of the rotor 30 and the stator core 21. This arrangement allows the short circuit portion 35a to short circuit the magnetic flux at portions thereof protruding from the facing surfaces of the rotor 30 and the stator core 21. Consequently, magnetic flux passing through the short circuit portion 35a hardly leaks to the stator core 21, and thus the counter electromotive force can be more easily lowered.

[First Modification]

Figure 10:
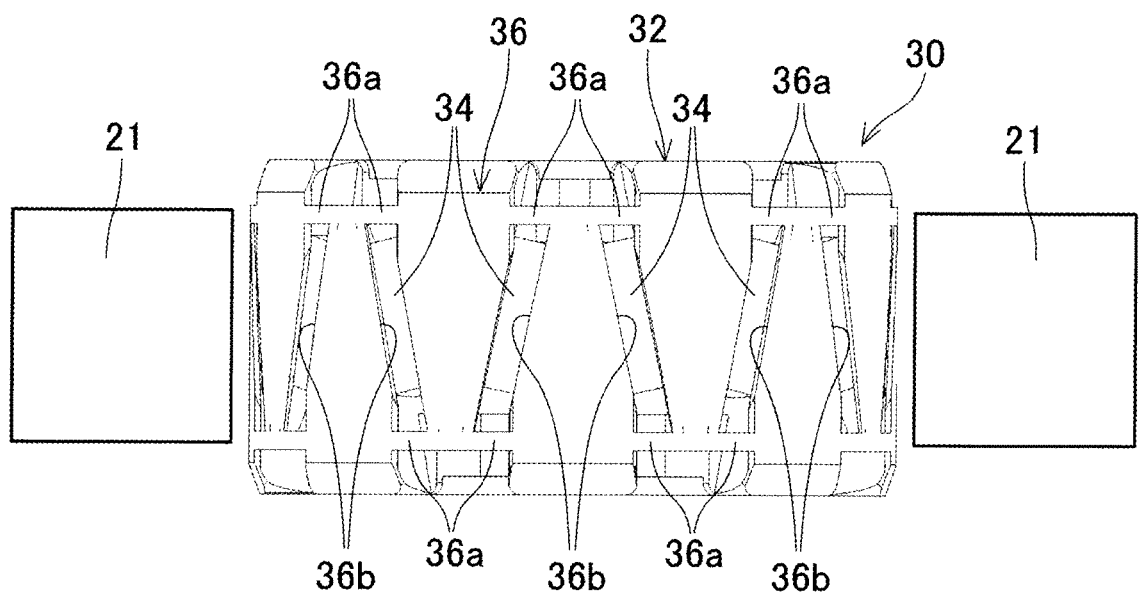
FIG. 10 illustrates the positional relationship between a short circuit portion of magnetic, flux short circuit members and the stator in a first modification.

As shown in FIG. 10, the first modification differs from the first embodiment in the structure of the magnetic flux short circuit member 36. The magnetic flux short circuit member 36 of the first modification is also formed of a soft magnetic material in a hollow cylindrical shape with a constant wall thickness, but differs from the magnetic flux short circuit member 35 of the first embodiment in that a plurality of window portions 36b are formed in areas radially facing the permanent magnet 34 disposed between the claw-shaped magnetic pole portions 323 adjacent in the circumferential direction of the field core 32. The window portions 36b extend in directions inclined from the axial direction along the circumferential side surface of the claw-shaped magnetic pole portions 323, and are circumferentially arranged in alternately reversed directions.

The magnetic flux short circuit member 36 is fitted and secured to the outer surface of the field core 32 while a part thereof other than the window portions 36b is in contact with the outer surfaces of the first and second claw-shaped magnetic pole portions 323a and 323b alternately arranged in the circumferential direction. With this arrangement, the magnetic flux short circuit member 36 has at its both axial ends a short circuit portion 36a magnetically connecting the first and second claw-shaped magnetic pole portions 323a and 323b adjacent in the circumferential direction. That is, one of the short circuit portions 36a connects root portions of the first claw-shaped magnetic pole portions 323a and tip portions of the second claw-shaped magnetic pole portions 323b, and the other short circuit portion 36a connects tip portions of the first claw-shaped magnetic pole portions 323a and root portions of the second claw-shaped magnetic pole portions 323b. As in the first embodiment, the axial cross-sectional area of the short circuit portion 36a is constant in the circumferential direction. In addition, the short circuit portion 36a has a part of it protruding axially outward from the radially facing surfaces of the rotor 30 and the stator core 21. Therefore, the first modification has the same operation and effect as those of the first embodiment. To reduce the counter electromotive force similarly to the short circuit portion 35a, the short circuit portion 36a may be formed of a material having a higher relative permeability than the field core 32 (in particular, the boss portion 321).

[Second Modification]

Figure 11:
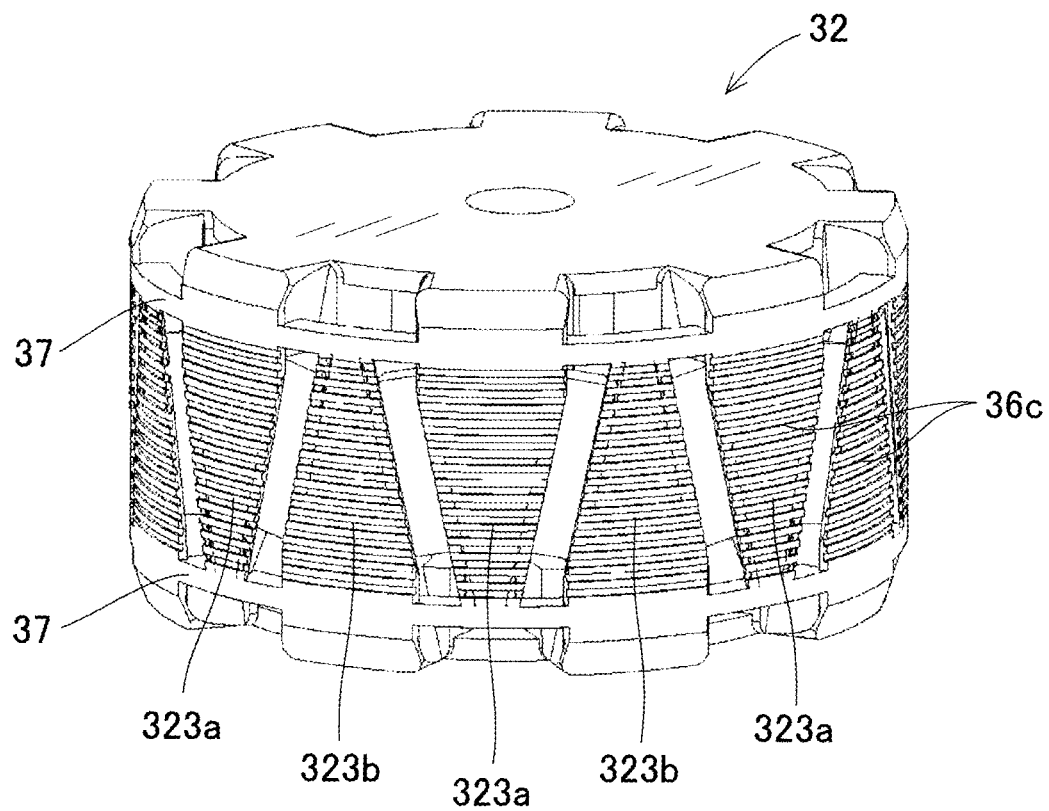
FIG. 11 is a perspective view of a rotor according to a second modification.

As shown in FIG. 11, the magnetic flux short circuit members 37 of a second modification correspond to the two short circuit portions 36a at both axial ends of the magnetic flux short circuit member 36 of the first modification. That is, the magnetic flux short circuit members 37 are formed of two ring-shaped members arranged at both axial ends of the field core 32. As with the short circuit portions 36a of the first modification, one of the magnetic flux short circuit members 37 connects the root portions of the first claw-shaped magnetic pole portions 323a and the tip portions of the second claw-shaped magnetic pole portions 323b, while the other magnetic flux short circuit member 37 connects the tip portions of the first claw-shaped magnetic pole portions 323a and the root portions of the second claw-shaped magnetic pole portions 323b.

The magnetic flux short circuit member 37 of the second modification, with the axially central portion eliminated, has a significantly lower weight preventing the claw-shaped magnetic pole portions 323 from being deformed radially outward due to the centrifugal force, as compared with the magnetic flux short circuit member 36 of the first modification. In addition, since the claw-like magnetic pole portions 323 are retained at the base portions, which are subject to a small amount of displacement due to the centrifugal force, and the tip portions, which are subject to a maximum amount of displacement due to the centrifugal force, the claw-like magnetic pole portions 323 are fixed at both ends to provide a synergistically robust structure. Retaining the tip portions of the claw-shaped magnetic pole portions 323 with the magnetic flux short circuit member 37 effectively suppresses radially outward deformation thereof. Furthermore, the magnetic flux short circuit members 37 of the second modification are mounted more easily than the magnetic flux short circuit member 36 of the first modification, which is mounted on the axially central portion of the field core 32, since the magnetic flux short circuit member 37 of the second modification is mounted at both axial ends of the field core 32.

In the second modification, grooves 36c circumferentially extending in a stripe pattern are formed (i.e., grooving) on the outer circumferential surface of the claw-shaped magnetic pole portions 323. This configuration reduces eddy current loss produced in the claw-shaped magnetic pole portions 323.

Second Embodiment

A rotating electric machine according to the second embodiment will be described with reference to FIGS. 12 to 15, 19, and 20. The rotating electric machine according to the second embodiment is a vehicle alternator similar to that of the first embodiment, with the main difference from the first embodiment in the configuration of the rotor 50. Hereinafter, different points and important points will be described. The same reference signs are used for elements common to the first embodiment, and detailed description thereof is omitted.

<Overall Configuration of Vehicle Alternator>

Figure 12:
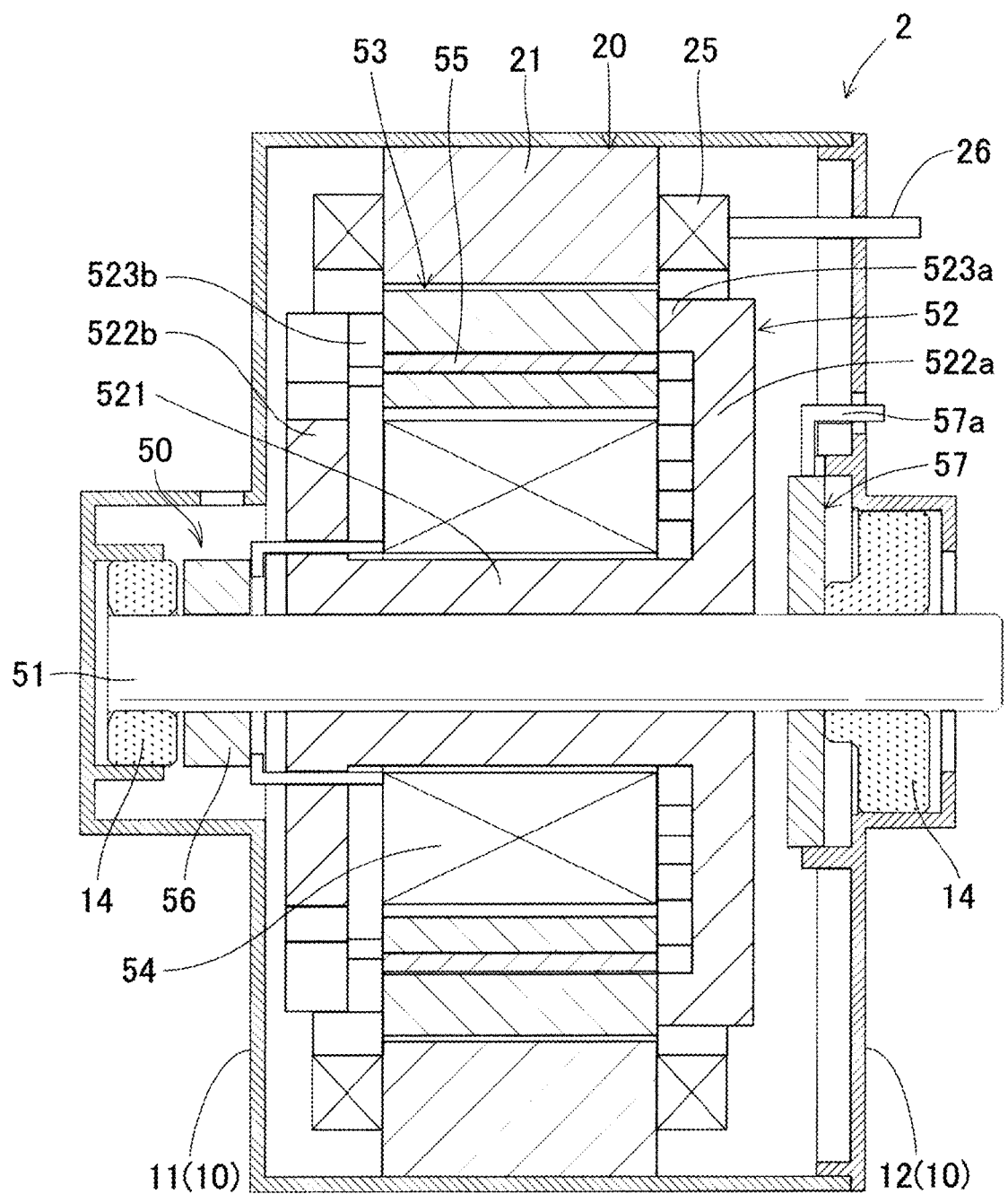
FIG. 12 is an axial cross-sectional view of a rotating electric machine according to a second embodiment.

As shown in FIG. 12, the vehicle alternator 2 of the second embodiment includes a housing 10, a stator 20, a rotor 50, a slip ring 56, a rotation sensor 57, and the like. The housing 10 includes a front housing 11 having a cylindrical shape with a closed-bottom and opened at one end, and a lid-like rear housing 12 fitted and secured to the open portion of the front housing 11.

The stator 20 is configured similarly to the first embodiment, and includes an annular stator core 21 having a plurality of slots 22 and a plurality of teeth 23 shown in FIGS. 19 and 20, and an armature winding 25 formed of three-phase windings wound in the slots 22 of the stator core 21. The reference sign 26 in FIG. 12 denotes an output line for outputting the electric power extracted from the armature winding 25. The stator 20 is secured to an axially central portion of the inner surface of the peripheral wall of the front housing 11.

As shown in FIG. 12, the rotor 50 includes a rotating shaft 51, a pole core 52, a core member 53, a field winding 54, and permanent magnets 55. The rotating shaft 51 is rotatably supported by the housing 10 via a pair of oil-retaining bearings 14, 14. The pole core 52 is fitted and secured to the outer surface of the rotating shaft 51. The core member 53 includes first and second magnetic pole portions 531*a*, 531*b*, a q-axis core portion 532, and a short circuit portion 533. The field winding 54 is wound around a boss portion 521 of the pole core 52. The permanent magnet 55 is disposed between the magnetic poles 531*a*, 531 and the q-axis core portion 532. The rotor 50 is rotatably provided on the inner side of the stator 20 so as to face the stator 20 in the radial direction, and is rotationally driven by an engine (not shown) mounted on a vehicle via a driving force transmission member (not shown) such as a pulley or a gear. The pole core 52 corresponds to a "core portion".

Figure 13:
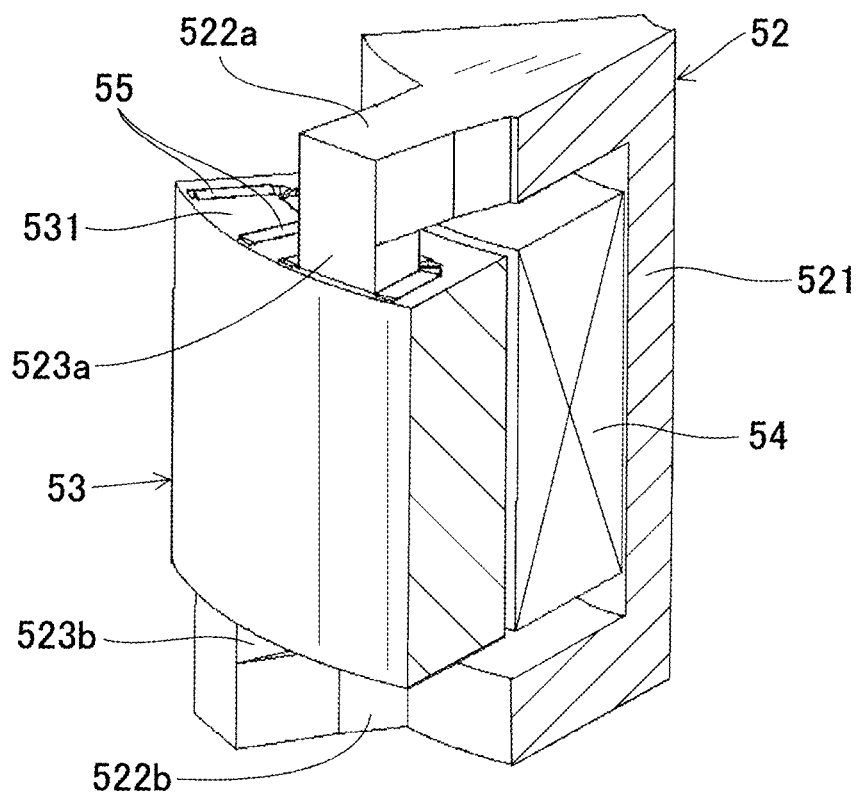
FIG. 13 is a partial perspective view of the rotor according to the second embodiment.
Figure 14:
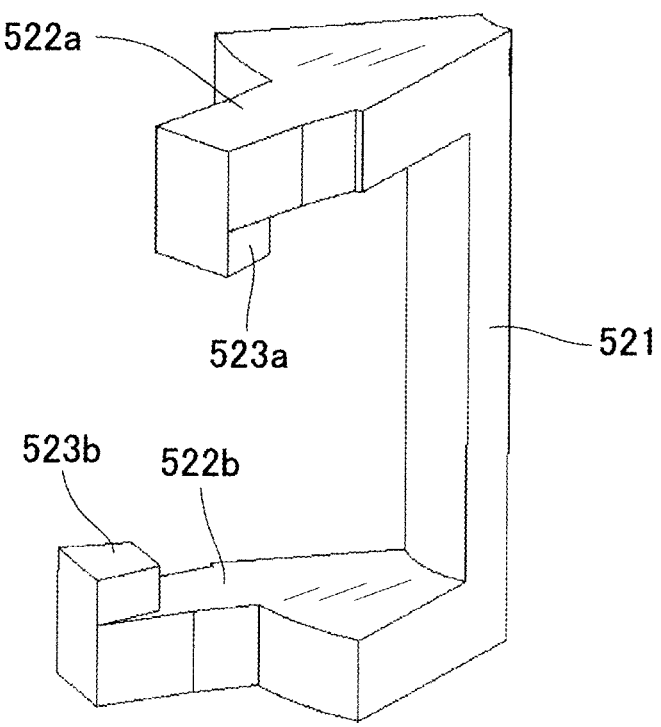
FIG. 14 is a partial perspective view of a pole core of the rotor according to the second embodiment.

As shown in FIGS. 13 and 14, the pole core 52 has a cylindrical boss portion 521 that allows the field flux to flow in the axial direction on the radially inner side of the field winding 54, and a first disc portion 522*a* and a second disc portion 522*b* which each project radially outward from axial ends of the boss portion 521 with a predetermined pitch in the circumferential direction. Eight first disc portions 522*a* are provided on one axial end side (upper side in FIGS. 13 and 14) of the boss portion 521, and each have a first protrusion 523*a* protruding from the radially outer tip thereof toward the other axial end side. Eight second disc portions 522*b* are provided on the other axial end side of the boss portion 521 and each have a second protrusion 523*b* protruding from the radially outer tip thereof toward the one axial end side. The first disc portions 522*a* and the second disc portions 522*b* are provided at positions offset from each other by 180 electrical degrees in the circumferential directions.

Figure 15:
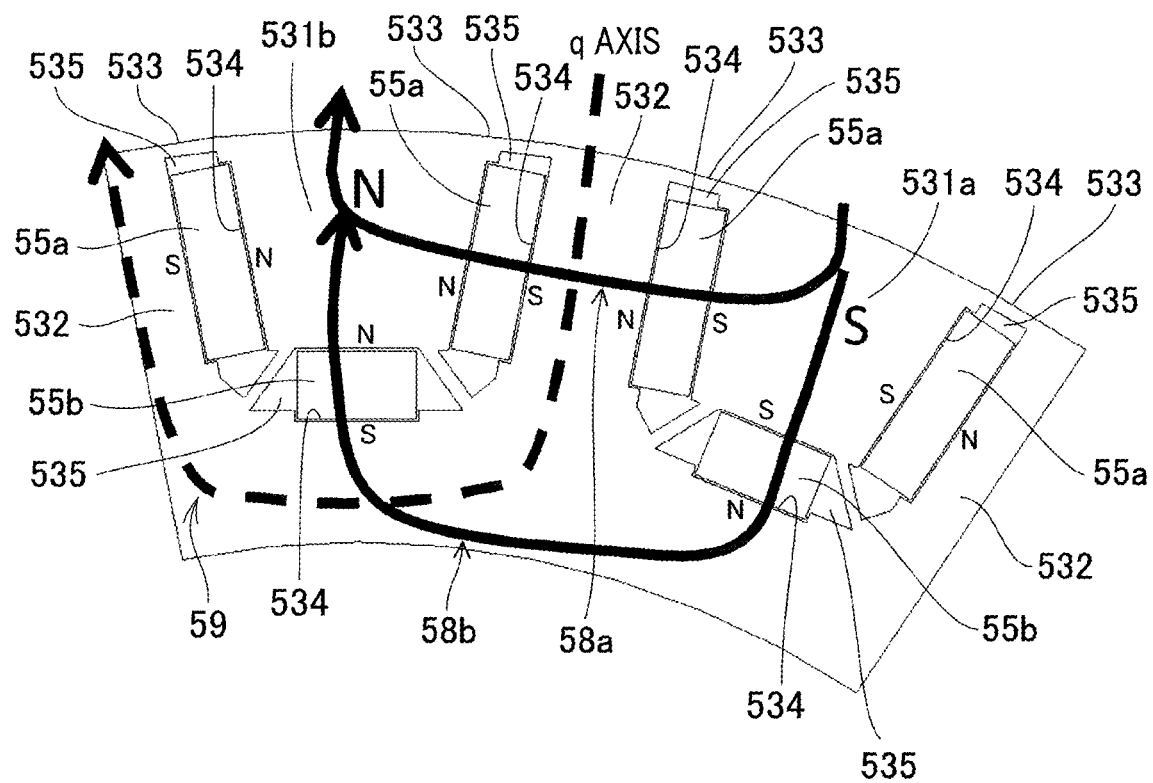
FIG. 15 is a partial plan view of a core member of the rotor according to the second embodiment.

As shown in FIGS. 13 and 15, the core member 53 includes a plurality of (16 in the second embodiment) magnetic pole portions 531, a q-axis core portion 532, and a short circuit portion 533. The magnetic pole portions 531 are arranged on the outer side of the field winding 54 so that magnetic poles of different polarities are alternately formed in the circumferential direction. The q-axis core portion 532 is positioned at 90 electrical degrees offset from the d-axis passing through the pole portion 531. The short circuit portion 533 is provided on the outer side of the magnetic pole portions 531 to magnetically connect the magnetic pole portions 531 adjacent to each other and having different polarities.

As the magnetic pole portions 531, eight first magnetic pole portions 531*a* magnetized to the S pole and eight second magnetic pole portion 531*b* magnetized to the N pole are alternately provided in the circumferential direction. On one side in the axial direction, an end surface of the first magnetic pole portion 531*a* abuts the first protrusion 523*a* of the first disc portion 522*a*, while on the other side in the axial direction, an end surface of the second magnetic pole portion 531*b* abuts the second protrusion 523*b* of the second disc portion 522*b*. Magnet accommodation holes 534 for accommodating permanent magnets 55 are provided at three positions on both sides in the circumferential direction and on the inner side of each magnetic pole portion 531. The magnet accommodation holes 534 have a larger cross-sectional shape than the permanent magnets 55, and magnetic air gaps (barriers) 535 are provided on both sides of the permanent magnets 55, accommodated in the magnet accommodation holes 534, in a direction of a hard axis of magnetization thereof. The short circuit portion 533 is provided integrally with the outer peripheral portion of the core member 53. Specifically, the short circuit portion 533 is located on the outer side of the q-axis core portion 532 and the two magnet accommodation holes 534 on both sides thereof in the circumferential direction. To reduce the counter electromotive force, the short circuit portion 533 is preferably made of a material having a higher relative permeability than the material of the pole core 52.

The field winding 54 is wound around the outer peripheral surface of the boss portion 521 while being insulated from the pole core 52, and is surrounded by the pole core 52 and the core member 53. The field winding 54 generates a magnetomotive force in the boss portion 521 with a supply of a field current If from a field current control circuit (not shown) via a brush (not shown) or a slip ring 56 secured to the rotating shaft 51. As a result, magnetic poles of different polarities are formed at the first magnetic pole portion 531*a* and the second magnetic pole portion 531*b* of the core member 53. In the second embodiment, the first magnetic pole 531*a* is magnetized to the S pole, while the second magnetic pole 531*b* is magnetized to the N pole.

As shown in FIG. 15, the permanent magnets 55 are individually accommodated in magnet accommodation holes provided at three positions on both sides in the circumferential direction and on the inner side of each of the magnetic pole portions 531. In this case, the permanent magnets 55*a* disposed between the magnetic pole portions 531 and the q-axis core portions 532 on both sides of each magnetic pole portion 531 in the circumferential direction are arranged to have their easy axis of magnetization oriented in the circumferential direction, and to have their polarity coincide with the polarity of the magnetic pole portions 531 which alternately appears by excitation. The permanent magnet 55*b* disposed on the inner side of each magnetic pole portion 531 is arranged to have its easy axis of magnetization directed in the radial direction and have its polarity on the radially outer side coincide with the polarity of the magnetic pole portion 531 which appears by excitation.

In the second embodiment, there are a first d-axis magnetic circuit 58*a* and a second d-axis magnetic circuit 58*b* as two types of d-axis magnetic circuits (shown by solid lines in FIG. 15) formed in the core member 53 by energization of the field winding 54. The first d-axis circuit 58*a* is a magnetic circuit that crosses the permanent magnets 55a disposed between the magnetic pole portions 531 and the q-axis core portion 532 in the circumferential direction. The second d-axis circuit 58b is a magnetic circuit that crosses the permanent magnets 55b disposed on the inner side of the magnetic pole portions 531 in the radial direction. There is a q-axis magnetic circuit 59 (shown by a broken line in FIG. 15) formed in the core member 53 by a current flowing through the armature winding 25 due to the magnetic flux linkage of the d-axis magnetic circuits. The q-axis magnetic circuit 59 passes from a q-axis core portion 532 to the inner side of the permanent magnet 55b and then to an adjacent q-axis core portion 532.

The rotation sensor 57 detects the rotation phase of the rotor 50. The rotation sensor 57 is connected by an output line 57a and a control unit (not shown) for controlling the vehicle alternator 2, and sends information on the detected rotation phase of the rotor 50 to the control unit.

In the vehicle alternator 2 having the above-described configuration, when a rotational force is transmitted from an engine (not shown) to the rotating shaft 51 via a driving force transmission member, the rotor 50 rotates together with the rotating shaft 51 in a predetermined direction. In this state, with the application of excitation voltages to the field winding 54 of the rotor 50 via the slip ring 56, the first and second magnetic pole portions 531a, 531b are excited, so that NS magnetic poles are alternately formed along the circumferential direction of rotation of the rotor 50. Thus, an alternating electromotive force is generated in the armature windings 25 of the stator 20 upon application of a rotating magnetic field to the armature windings 25. The alternating electromotive force generated in the armature winding 25 passes through a rectifier (not shown) to be rectified into a direct current, and then is taken out from an output terminal and supplied to a battery (not shown).

The vehicle alternator 2 according to the second embodiment configured as described above is configured to satisfy the relationship $Ab \cdot Bsb + As \cdot Bss \geq 2 \cdot Br \cdot Am$ and $0.03 \leq As/Ab \leq 0.22$ where Ab is the axial cross-sectional area of the boss 521 per a pair of NS magnetic poles (hereinafter "boss portion's cross-sectional area Ab") and Bsb is the magnetic flux density of the material of the boss portion 521 at a magnetic field strength of 5000 A/m, Br is the residual flux density of the permanent magnet 55, Am is the surface area of the permanent magnet 55 at magnetic flux inflow/outflow surfaces, As (hereinafter "short circuit portion's cross-sectional area As) is the circumferential cross-sectional area of the short circuit portion 533, and Bss is the magnetic flux density of the material of the short circuit portion 533 at a magnetic field strength of 5000 A/m. The rotor 50 is configured to satisfy the relationship $1 \leq (Ab \cdot Bsb + As \cdot Bss)/(2 \cdot Br \cdot Am) \leq 1.4$.

<Functions and Effects>

According to the vehicle alternator 2 of the second embodiment configured as described above, the rotor 50 is configured to satisfy the relationship $Ab \cdot Bsb + As \cdot Bss \geq 2 \cdot Br \cdot Am$ and $0.03 \leq As/Ab \leq 0.22$. Consequently, the same operation and effect as those of the first embodiment are achieved; for example, sufficient reliability in strength is accomplished while the expansion of the air gap is suppressed, high output is accomplished by making the field characteristics and maximum magnetic flux equal to or higher, and thermal reliability is secured by reducing the amount of heat generated by the field winding 54.

In the second embodiment, the rotor 50 is configured to satisfy the relationship $1 \leq (Ab \cdot Bsb + As \cdot Bss)/(2 \cdot Br \cdot Am) \leq 1.4$. As a result, in a low voltage range, the same operation and effect as those of the first embodiment can be obtained; for example, the counter electromotive force can be reduced, and the cost can be reduced by using fewer permanent magnets 55.

In the rotor 50 of the second embodiment, the core member 53 embedded with the permanent magnets 55a and 55b is sandwiched between the disc portions 522 of the pole core 52 from both sides in the axial direction. Thus, in the present configuration where the inductance of a d-axis is low, the q-axis torque at the core member 53 can be effectively used.

Furthermore, the rotor 50 includes a core member 53 provided on the outer side of the magnetic pole portion 531 and having a short circuit portion 533 that magnetically connects the magnetic pole portions 531 of different polarities. This configuration allows a short circuit magnetic path of the short circuit portion 533 to be used as the counter electromotive force suppressing structure. Thus, a space for the field winding 54 can be increased by reducing the cross-sectional area of the boss portion 521 and the disc portion 522. Therefore, this configuration is more effective in achieving the thermal reliability.

Third Embodiment

A rotating electric machine according to a third embodiment will be described with reference to FIGS. 16 to 22. The rotating electric machine according to the third embodiment is similar to that of the first embodiment, with the main difference from the first embodiment in the configuration of the rotor 30. Hereinafter, different points and important points will be described. The same reference signs are used for elements common to the first embodiment, and detailed description thereof is omitted.

<Overall Configuration of Vehicle Alternator>

Figure 16:
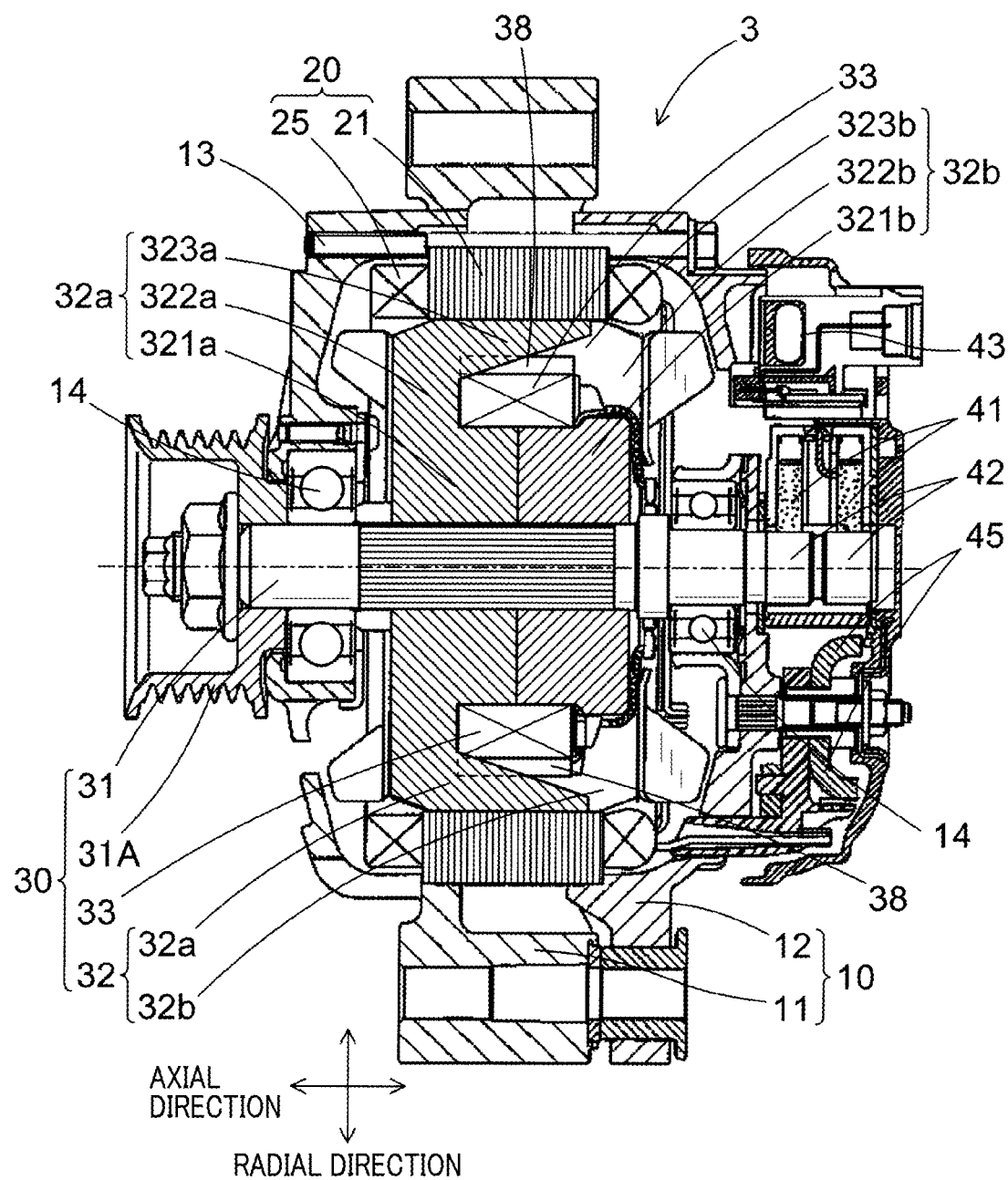
FIG. 16 is an axial cross-sectional view of a rotating electric machine according to a third embodiment.

As shown in FIG. 16, the vehicle alternator 3 according to the third embodiment includes a housing 10, a stator 20, a rotor 30, a field winding power supply device, a rectifier 45, and the like. The difference is that a magnetic flux short circuit member 38 is provided in the vehicle alternator 3 instead of the magnetic flux short circuit member 35 provided in the vehicle alternator 1 (FIG. 1) of the first embodiment.

The magnetic flux short circuit member 38 corresponds to the short circuit portions 35a and 36a of the first embodiment. The magnetic flux short circuit member 38 is a soft magnetic material (e.g., a magnetic iron plate) that connects circumferentially and alternately arranged claw-shaped magnetic pole portions 323 of different polarities so as to magnetically short circuit them.

Figure 17:
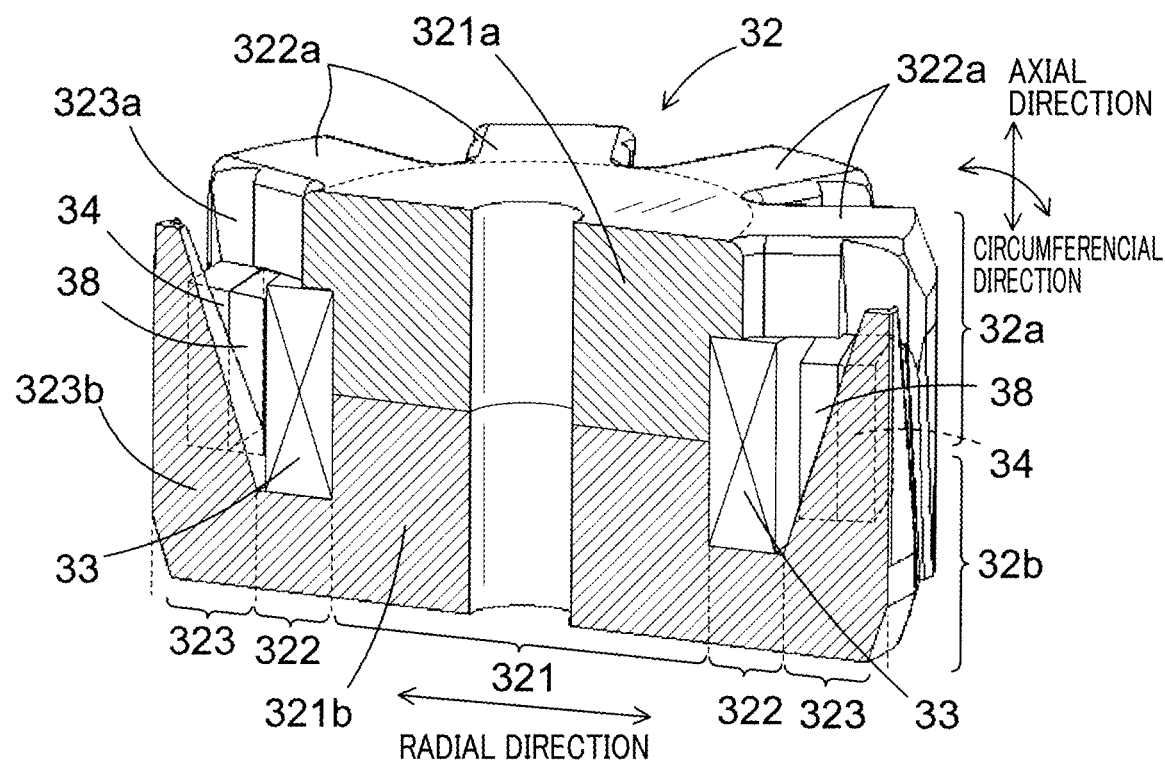
FIG. 17 is a partial cross-sectional and perspective view illustrating a core member of a rotor according to the third embodiment.
Figure 18:
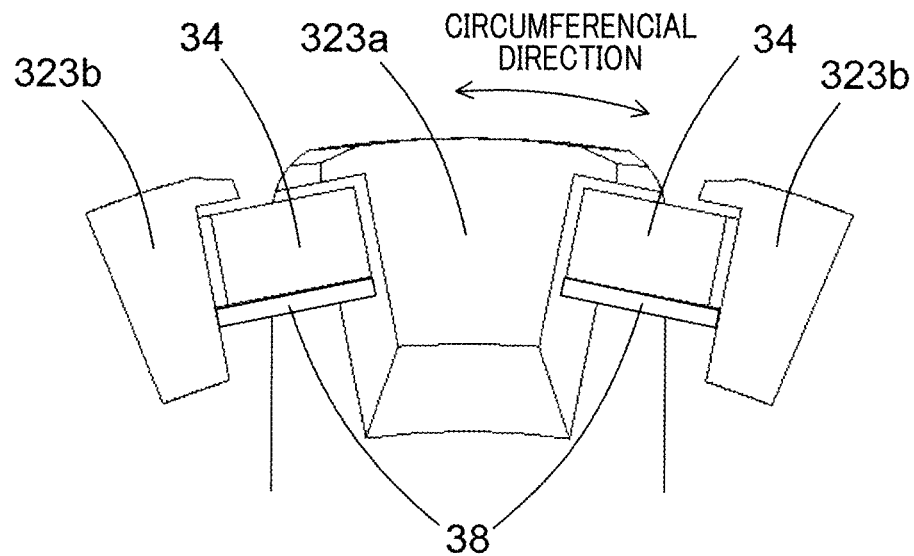
FIG. 18 is a perspective view of a magnetic flux short circuit member according to the third embodiment.

As shown in FIG. 17, the magnetic flux short circuit member 38 of the present embodiment is provided radially inward of the permanent magnet 34 and radially outward of the field winding 33. Furthermore, as shown in FIG. 18, the magnetic flux short circuit member 38 of the present embodiment is provided in contact with both claw-shaped magnetic pole portions 323 adjacent in the circumferential direction (i.e., a first claw-shaped magnetic pole portion 323a and a second claw-shaped magnetic pole portion 323b). That is, since the magnetic flux short circuit member 38 is in contact with the claw-shaped magnetic pole portions 323 while being disposed between the field winding 33 and the permanent magnet 34, the magnetic flux short circuit member 38 magnetically short circuits the claw-shaped magnetic pole portions 323 of different polarities. The magnetic flux short circuit member 38 may be disposed in contact with the claw-shaped magnetic pole portions 323, may be disposed by bonding or joining it to the permanent magnet 34, or may be disposed by bonding it to the field winding 33. The joining may be fusion welding such as arc welding or laser beam welding, pressure welding such as resistance welding or forge welding, or brazing such as soldering.

<Function of the Magnetic Flux Short Circuit Member 38>

A technique of controlling the flow of the magnet magnetic flux ψn according to the field current If flowing through the field winding 33 will be described. Here, a finished rotating electric machine cannot easily measure the magnetoresistance of the stator 20 and the rotor 30. Since the inductance varies with the square of the number of turns, it is difficult to evaluate the magnitude relationship. Therefore, for evaluation in this embodiment, a permeance is used that can be easily measured by a measurement method described later and calculated. The permeance P[H] has the relationship $P=L/N^2$, which is a general expression, where L[H] is the inductance and N is the number of turns of windings. Therefore, if the inductance is measured, permeance can be easily determined. Since the number of turns N is a constant, the permeance P and the inductance L have a proportional relationship.

When the field current If flows through the field winding 33, a d-axis magnetic circuit Md that generates the counter electromotive force of the rotor 30 is formed as shown by the thick broken line in FIGS. 19 and 20. The d-axis magnetic circuit Md shown in FIG. 19 is formed by the magnetic flux passing through the boss portion 321 of the field core 32 and a pair of a first claw-shaped magnetic pole portion 323a and a claw-shaped magnetic pole portion 323b. The boss portion 321 corresponds to a "core portion".

An example of the flow of the magnetic flux is shown by a thick broken line in FIG. 20. In this example, a current flows through the field winding 33, and the first pole core 32a and the second pole core 32b are magnetized to the N pole and the S pole, respectively. First, the magnetic flux flows from the tooth 23 of the d-axis of the stator core 21 to the second claw-shaped magnetic pole portion 323b of the field core 32. Then, the magnetic flux flows to the second disc portion 322b, the second boss portion 321b, the first boss portion 321a, the first disc portion 322a, and the first claw-shaped magnetic pole portion 323a. After returning to the stator core 21 from the tooth 23 in the position on the stator core 21 offset by one pole, the magnetic flux flows through the back yoke 24 to reach the tooth 23 of the d-axis in the position offset by one pole. Although not illustrated, when the first pole core 32a and the second pole core 32b are magnetized to the S pole and N pole, respectively, the magnetic flux flows in the reverse order of the abovementioned order.

Considering the d-axis magnetic circuit Md described above, the permeance Prt[H] of the rotor 30 can be obtained by measuring the inductance of the field winding 33. The permeance Prt[H] of the rotor 30 can be obtained by the expression $Prt=Lr/Nr^2$, where Nr is the number of turns of the field winding 33 and Lr[H] is the measured inductance.

The permeance Pst[H] of the stator 20 can be obtained by measuring the inductance of the armature winding 25. The inductance of the armature winding 25 can be obtained by the equation $Pst=Ls/Ns^2$, where Ns is the number of turns of the armature winding 25 and Ls[H] is the measured inductance.

Figure 21:
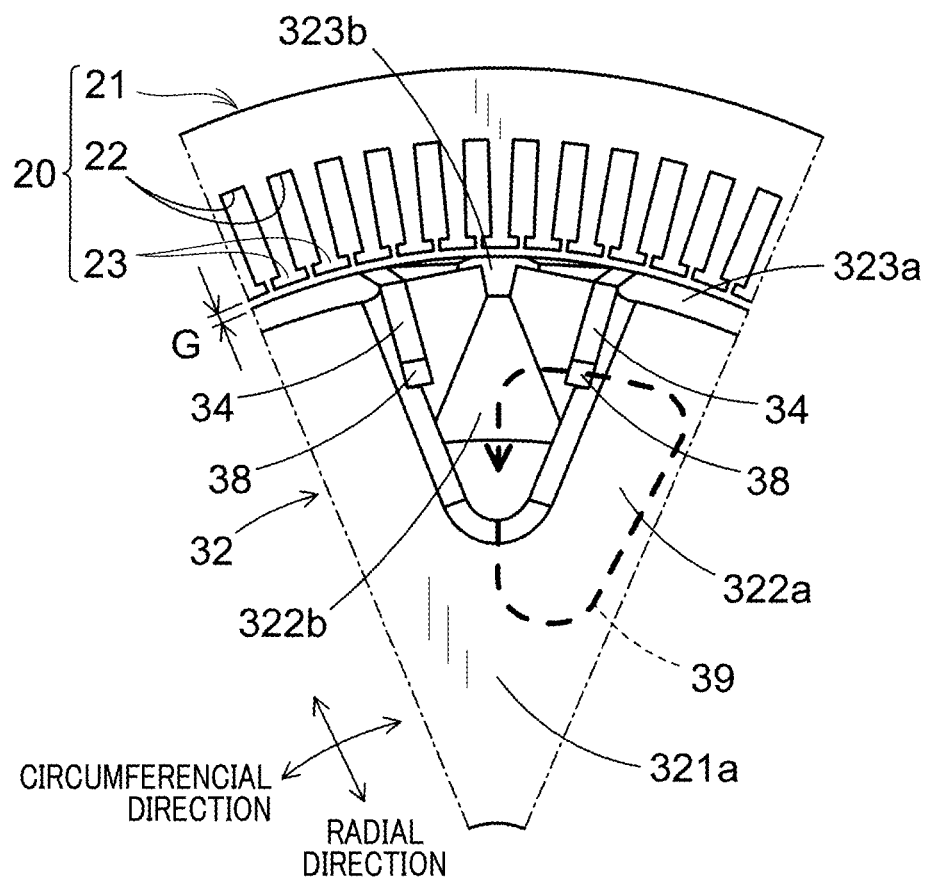
FIG. 21 is a partial plan view of a magnetic circuit of a d-axis, according to the third embodiment.

In this embodiment, as shown in FIGS. 16 and 17, the rotor 30 has permanent magnets 34 and magnetic flux short circuit members 38. Therefore, a new magnetic circuit 39 shown by a thick broken line in FIG. 21 is formed. The magnetic circuit 39 is formed when the field current If does not flow (i.e., If=0), and flows through the boss portion 321, the disc portion 322, and the magnetic flux short circuit member 38 to be completed in the rotor 30. On the other hand, when the field current If flows, the magnetic circuit 39 is not formed because the magnetic flux passing through the magnetic flux short circuit member 38 becomes saturated. That is, the magnetic flux short circuit member 38 serves as a shortest circuit path suppressing the magnet magnetic flux when the field current If does not flow, and eliminates the leakage magnetic flux when the field current If flows. Therefore, when the field current If flows, almost all the magnet magnetic flux ψn from which the leakage magnetic flux is eliminated can be supplied to the stator 20 side, so that the vehicle alternator 3 acts like a permanent magnet motor.

Figure 22:
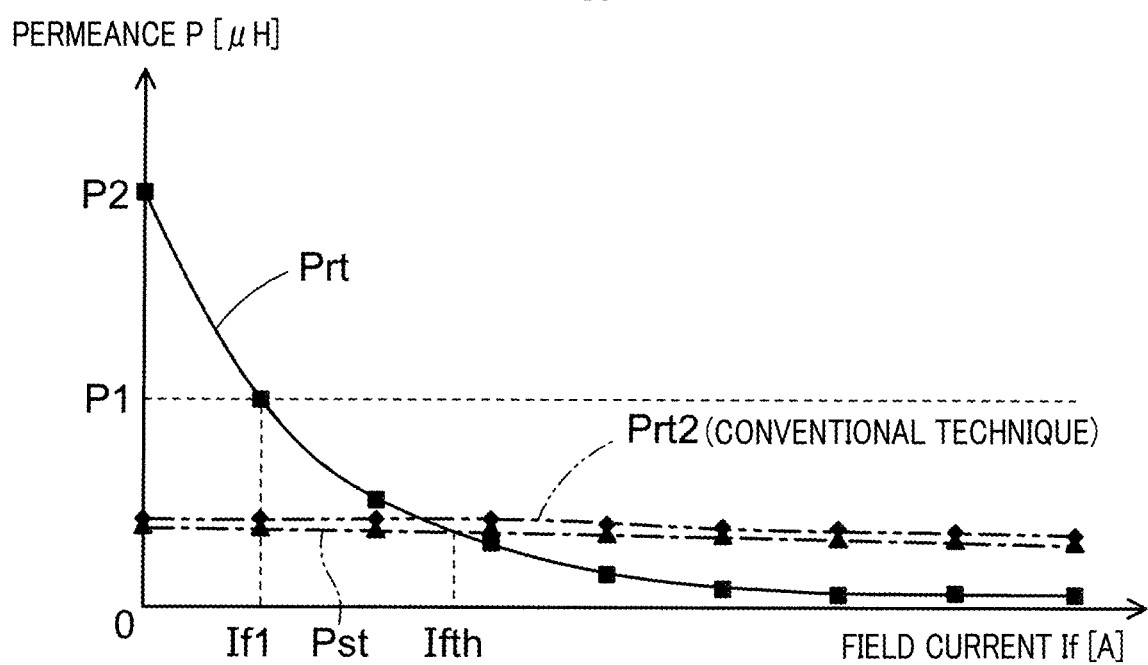
FIG. 22 is a graph illustrating the relationship between the field current and permeance.

FIG. 22 shows changes in permeances Prt and Pst with respect to the field current If. The permeance Prt indicated by the solid line and the permeance Pst indicated by the dot-dashed line are both based on inductances measured with the rotor 30 alone. As a comparative example, the permeance Prt2 shown by the two-dot-dashed line is obtained with a conventional rotor which does not have the permanent magnet 34 and the magnetic flux short circuit member 38.

The permeance Prt is the maximum value P2 when the field current If under no load is 0 [A], and decreases as the field current If increases. When the field current If is If1[A] or more, the permeance Prt is the half value P1 or less. The half value P1 is obtained by halving the maximum value P2. Since the permeance P and the inductance L have a proportional relationship as mentioned above, the permeance P can be read as the inductance L. That is, when the field current If is greater than or equal to If1[A] that flows under load, the inductance L is less than or equal to half the value when the field current If is 0 [A].

In contrast, the permeance Pst changes within a certain range regardless of the magnitude of the field current If. Therefore, Prt>Pst under no load, and Pst>Prt under load. Strictly speaking, Pst>Prt holds only when the field current If is larger than the threshold current Ifth (i.e., If>Ifth). Under load, the rated current of the field current If flowing through the field winding 33 is the amount of current that can be dealt with by the capability of typical brushes (e.g., If=4 to 20 [A]), and therefore a current larger than the threshold current Ifth is flowing. If the brushes improve, a field current If exceeding 20 [A], which is a typical brush capability, may be allowed to flow (e.g., 30 [A] or 50 [A]).

As described above, when the field current If is 0 [A], the permeance of the rotor 30 and the stator 20 is Prt>Pst, where the magnet magnetic flux ψn can be retained within the rotor 30. Since the magnetic flux short circuit member 38 is provided between claw-shaped magnetic pole portions 323 circumferentially arranged to have different polarities, the magnetic flux short circuit member 38 can sufficiently short circuit the magnetic flux ψ to reduce the counter electromotive force.

When the field current If is a current under load, the permeance of the rotor 30 and the stator 20 is Pst>Prt, where the magnet magnetic flux ψn can be allowed to flow to the stator 20 side. Since the magnetic flux short circuit member 38 provided between the circumferentially arranged claw-shaped magnetic pole portions 323 of different polarities becomes saturated with the field flux ψm generated by the field current If flowing through the field winding 33, the magnet magnetic flux ψn is allowed to flow toward the stator 20. Thus, the magnitude relationship between the permeance of the rotor 30 and the permeance of the stator 20 can be controlled based on the magnitude of the field current If flowing through the field winding 33.

(Operation and Effect)

According to the vehicle alternator 3 of the third embodiment configured as described above, the rotor 30 is configured to satisfy the relationship Ab·Bsb+As·Bss≥2·Br·Am and 0.03≤As/Ab≤0.22. Thus, when the field magnetic flux is excited by the field core 32 due to energization of the field winding 33, the magnetic flux flowing through the boss portion 321 wound with the field winding 33 becomes saturated, causing the magnetic force ψm of the permanent magnets 34 to flow out to the stator 20. Therefore, the magnetic force ψm of the permanent magnet 34 allows a magnetic force to be increased by an amount greater than or equal to a decrease in the capability of the magnetic flux short circuit member 38 provided between conventional claw-shaped magnetic pole portions, due to magnetic flux leakage, thus achieving high output by improving the field characteristics and maximum magnetic flux.

In the third embodiment, when the inductance is measured using the rotor 30 alone, the inductance under load is less than half the inductance under no load. This configuration allows the magnet magnetic flux ψn to be guided toward the stator 20 under load, and the magnet magnetic flux ψn to be short circuited in the rotor 30 under no load. In addition, this configuration achieves a high magnetic flux while improving the effect of suppressing the counter electromotive force under no load, which effect is one of the reasons for using the Lundell-type.

In the third embodiment, the magnetic flux short circuit member 38 corresponding to the short circuit portions is provided in at least one of a space between the permanent magnet 34 and the field winding 33 and a space between the permanent magnet 34 and the radial end of teeth of the stator core 21. This configuration reduces the counter electromotive force. A very low magneto-resistive counter electromotive force suppressing magnetic path is provided that does not pass through the air gap between the rotor 30 and the stator 20, so that the counter electromotive force can be reduced to about 50% to 70%.

In the third embodiment, the magnetic flux short circuit member 38 corresponding to the short circuit portions is made of a material having a higher relative permeability than the material of the boss portion 321 corresponding to the core portion. This configuration allows the counter electromotive force to be reduced more effectively because the non-magnetic permeability of the short circuit magnetic path having the magnetic flux reducing effect under no load is high.

Figure 23:
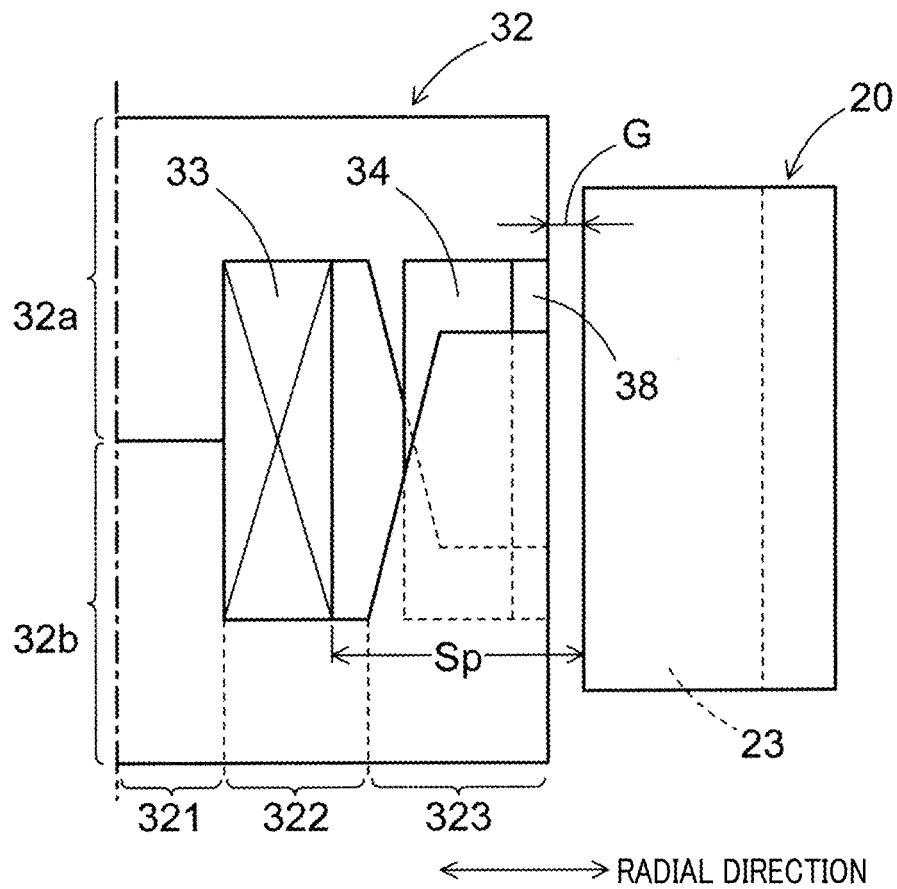
FIG. 23 is a schematic diagram showing an example of the arrangement of a magnetic flux short circuit member.
Figure 24:
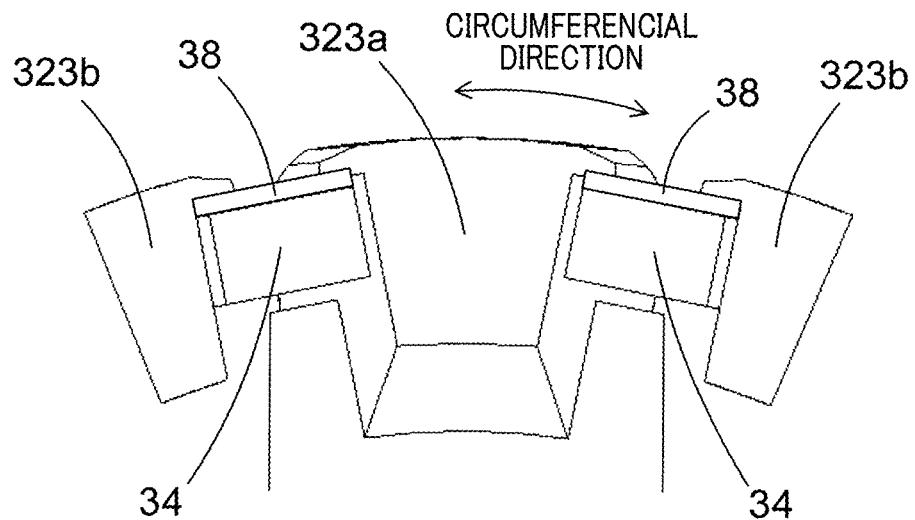
FIG. 24 is a perspective view of a modification of the magnetic flux short circuit member according to the third embodiment.
Figure 25:
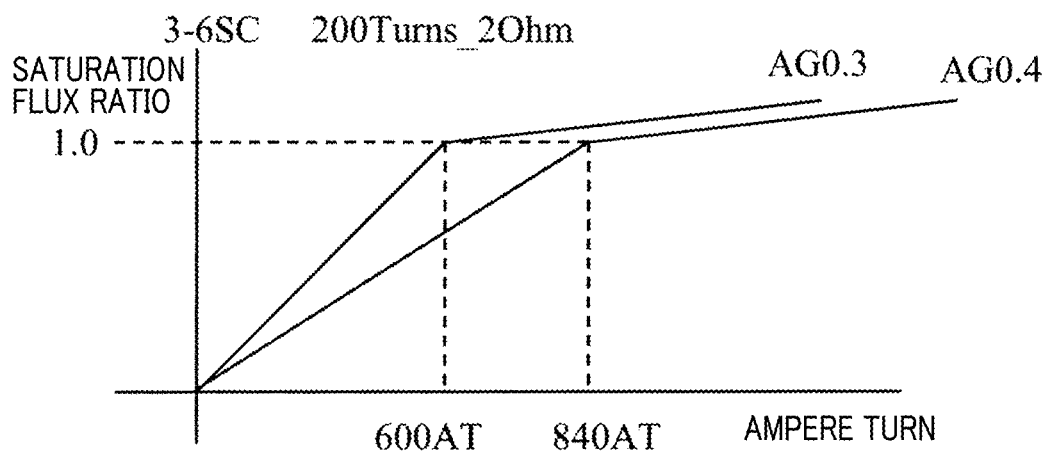
FIG. 25 shows the relationship between the ampere turn and the saturation flux density when the air gap is set to 0.3 mm and 0.4 mm.
Figure 26:
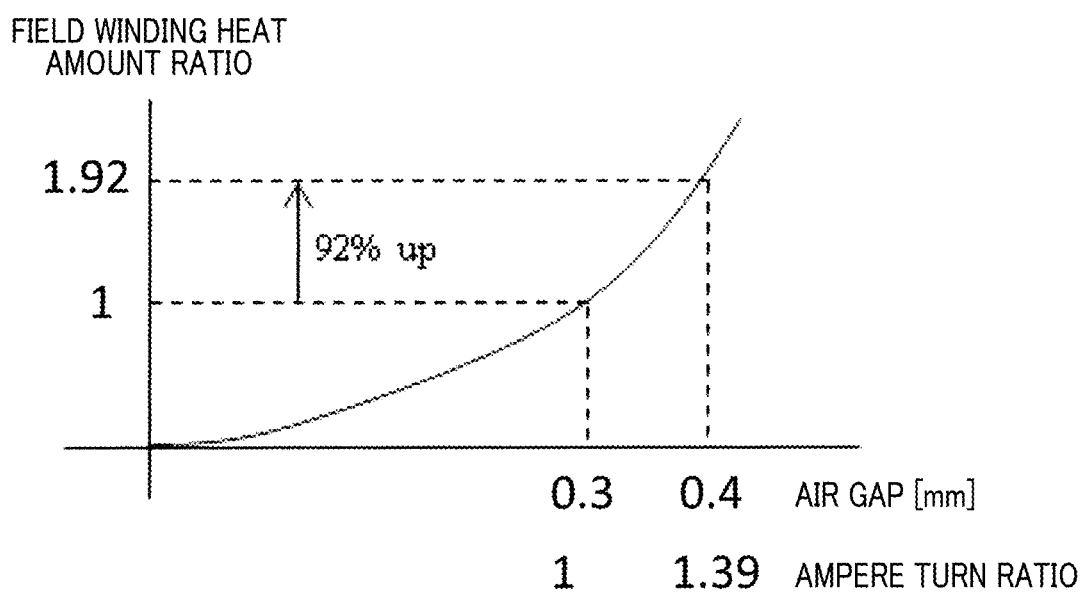
FIG. 26 shows the relationship between the ampere turn ratio and the amount of heat generated by the field winding when the air gap is set to 0.3 mm and 0.4 mm.

In the third embodiment, as shown in FIGS. 16 and 17, the magnetic flux short circuit member 38 is provided in a space between the permanent magnet 34 and the field winding 33. As illustrated in FIGS. 23 and 24, the magnetic flux short circuit member 38 may be provided in a space between the permanent magnet 34 and the radial end of teeth 23 of the stator core 21 (in FIG. 23, the left end surface of the stator 20). Alternatively, the magnetic flux short circuit member 38 may be provided in both a space between the permanent magnet 34 and the field winding 33 and a space between the permanent magnet 34 and the radial end of teeth 23. In short, one or more magnetic flux short circuit members 38 can be provided between the circumferentially arranged claw-shaped magnetic pole portions 323 of different polarities, and in the space Sp (shown in FIG. 23) between the field winding 33 and the radial end of teeth 23 except for the area of the the permanent magnet 34. The above-described operation and effect can be obtained in any of the positions.

In the third embodiment, the magnetic flux short circuit member 38 is configured to control the permeance of the rotor 30 and the stator 20 so that Prt>Pst when the field current If is 0 [A], and that Pst>Prt when the field current If is a current under load. This can be similarly achieved by the short circuit portions 35a and 36a of the first embodiment and the short circuit portion 533 of the second embodiment. That is, the operation and effect of the third embodiment can be obtained in the first and second embodiments.

Other Embodiments

The present invention is not limited to the embodiments described above, and various modifications can be made thereto without departing from the spirit of the present invention. For example, the rotating electric machine of the present invention is used as a vehicle alternator in the above embodiments, but the present invention can also be used as an electric motor serving as a rotating electric machine mounted on a vehicle, or as a rotating electric machine in which a generator or an electric motor can be selectively used.

[Aspects of the Present Disclosure]

According to a first aspect of the present disclosure, in a rotating electric machine including a stator (20) having a stator core (21) wound with an armature winding (25), and a rotor (30) disposed on the inner side of the stator so as to face the stator in the radial direction, the rotor including a field core (32) having a cylindrical boss portion (321, 321a, 321b), and a plurality of claw-shaped magnetic pole portions (323, 323a, 323b) that are arranged on the outer side of the boss portion and form poles of different polarities in the circumferential direction, a field winding (33) that is wound around the outer periphery of the boss portion and generates a magnetomotive force by energization, a permanent magnet (34) arranged between the circumferentially adjacent claw-shaped magnetic pole portions so as to have its easy axis of magnetization oriented in the circumferential direction and have its polarity coincide with the polarity of the claw-shaped magnetic pole portions which alternately appears by excitation, and a magnetic flux short circuit member (35, 36, 37, 38) having a short circuit portion (35a, 36a) that magnetically connects the claw-shaped magnetic pole portions circumferentially arranged to have different polarities.

The rotor is configured to satisfy Ab·Bsb+As·Bss≥2·Br·Am and 0.03≤As/Ab≤0.22, where Ab is the axial cross-sectional area of the boss portion per a pair of NS magnetic poles, Bsb is the magnetic flux density of the material of the boss portion at a magnetic field strength of 5000 A/m, Br is the residual flux density of the permanent magnet, Am is the surface area of the permanent magnet at magnetic flux inflow/outflow surfaces, As is the circumferential cross-sectional area of the short circuit portion, and Bss is the magnetic flux density of the material of the short circuit portion at a magnetic field strength of 5000 A/m.

According to this configuration, when the field magnetic flux is excited by the field core upon energization of the field winding, the magnetic flux flowing through the boss portion wound with the field winding becomes saturated, so that the magnetic force ψm of the permanent magnet can flow out to the stator. Therefore, the magnetic force ψm of the permanent magnet allows a magnetic force to be increased by an amount greater than or equal to a decrease in the capability of the short circuit portion, provided between conventional claw-shaped magnetic pole portions, due magnetic flux leakage, allowing the field characteristics and the maximum magnetic flux to be set high, and thus achieving high output.

The magnetic flux short circuit member is disposed on the outer side or the inner side of claw-shaped magnetic pole portions, or in a space excluding the area of the permanent magnet, located between circumferentially arranged claw-shaped magnetic pole portions of different polarities. If the magnetic flux short circuit member is disposed on the outer side of the claw-shaped magnetic pole portions, the resistance of the claw-shaped magnetic pole portions to the centrifugal force increases in radial directions. This suppresses the claw-shaped magnetic pole portions from expanding radially outward by the centrifugal force. Therefore, the air gap between the stator and the rotor can have the same size as for conventional Lundell-type rotors with no magnets, which constitute a majority of rotors distributed. Consequently, sufficient reliability in strength is accomplished while the expansion of the air gap is suppressed. In addition, the smaller air gap lowers the field current flowing through the field winding, thus reducing the amount of heat generated by the field winding as compared with conventional Lundell-type rotors with magnets. Thus, thermal reliability can be achieved with the capability of an existing air-cooling mechanism.

In a second aspect of the present invention, according to the first aspect, the rotor is configured so that $1 \leq (Ab \cdot Bsb + As \cdot Bss)/(2 \cdot Br \cdot Am) \leq 1.4$ holds. According to this configuration, the counter electromotive force can be reduced in a low voltage range, and reduced cost is achieved using fewer permanent magnets.

In a third aspect of the present invention, according to the first aspect or the second aspect, the short circuit portion has a constant axial cross-sectional area in the circumferential direction. This configuration makes it possible to easily derive the relational expression of the first aspect, which is set using the circumferential cross-sectional area of the short circuit portion. Furthermore, since the short circuit portion has no stress concentration coefficient and thus experiences no stress concentration, the claw-shaped magnetic pole portion has resistance to the centrifugal force and strength sufficient to resist the expansion of the claw-shaped magnetic pole portion.

In a fourth aspect of the present invention, according to any one of the first to third aspects, the short circuit portion has at least a portion thereof protruding axially outward from the radially facing surfaces of the rotor and the stator core. This configuration allows the short circuit portion to short circuit the magnetic flux at portions thereof protruding from the facing surfaces of the rotor and the stator core. Consequently, magnetic flux passing through the short circuit portion hardly leaks to the stator core, and thus the counter electromotive force can be more easily lowered.

According to a fifth aspect of the present invention, in a rotating electric machine including a stator (20) having a stator core (21) wound with an armature winding (25), and a rotor (30) disposed on the inner side of the stator so as to face the stator in the radial direction. The rotor includes a pole core (52) having a cylindrical boss portion (521) and a disc portion (522, 522a, 522b) protruding radially outward from both axial ends of the boss portion with a predetermined pitch in the circumferential direction, a core member (53) having a plurality of magnetic pole portions (531, 531a, 531b) that are circumferentially arranged and form magnetic poles of alternately different polarities, a q-axis core portion (532) located at a position deviated by 90 electrical degrees from a d-axis passing through the magnetic pole portions, and a short circuit portion (533) that magnetically connects the magnetic pole portions circumferentially arranged to have different polarities, a field winding (54) that is wound around the outer periphery of the boss portion and generates a magnetomotive force by energization, and a permanent magnet (55) disposed between the magnetic pole portion and the q-axis core portion so as to have its polarity coincide with the polarity of the magnetic pole portions which alternately appears.

The rotor is configured to satisfy $Ab \cdot Bsb + As \cdot Bss \geq 2 \cdot Br \cdot Am$ and $0.03 \leq As/Ab \leq 0.22$, where Ab is the axial cross-sectional area of the boss portion per a pair of NS magnetic poles, Bsb is the magnetic flux density of the material of the boss portion at a magnetic field strength of 5000 A/m, Br is the residual flux density of the permanent magnet, Am is the surface area of the permanent magnet at magnetic flux inflow/outflow surfaces, As is the circumferential cross-sectional area of the short circuit portion, and Bss is the magnetic flux density of the material of the short circuit portion at a magnetic field strength of 5000 A/m.

According to this configuration, when the field magnetic flux is excited by the field core upon energization of the field winding, the magnetic flux flowing through the boss portion wound with the field winding becomes saturated, so that the magnetic force ψm of the permanent magnet can flow out to the stator. Therefore, the magnetic force ψm of the permanent magnet allows a magnetic force to be increased by an amount greater than or equal to a decrease in the capability of the short circuit portion, provided between conventional claw-shaped magnetic pole portions, due magnetic flux leakage, thus achieving high output by improving the field characteristics and maximum magnetic flux. This effect is not limited to the cylindrical member provided on the outer side, but can also be achieved by a magnetic iron plate or the like provided on the inner side of the magnetic pole portion. Furthermore, in embodiments described later, the cylindrical magnetic flux short circuit member is disposed on the outer side of the claw-shaped magnetic pole portions. With this configuration, the resistance of the claw-shaped magnetic pole portions to the centrifugal force increases in the radial direction, thus suppressing the claw-shaped magnetic pole portions from being expanded radially outward by the centrifugal force. Therefore, the air gap between the stator and the rotor can have the same size as for conventional Lundell-type rotors with no magnets, which constitute a majority of rotors distributed. Consequently, sufficient reliability in strength is accomplished while the expansion of the air gap is suppressed.

In addition, since the smaller air gap minimizes the field current flowing through the field winding, the amount of heat generated by the field winding can be reduced by about 90% in a very effective manner as compared with conventional Lundell-type rotors with magnets. Thus, thermal reliability can be achieved with the capability of an existing air-cooling mechanism. In addition, since the rotor is configured to include a pole core having a boss portion and a disc portion, and a core member having a plurality of magnetic pole portions, a q-axis core portion, and a short circuit portion, the reluctance torque and the regenerative output can be increased.

In a sixth aspect of the present invention, according to the fifth aspect, the rotor is configured so that $1 \leq (Ab \cdot Bsb + As \cdot Bss)/(2 \cdot Br \cdot Am) \leq 1.4$ holds. According to this configuration, the counter electromotive force can be reduced in a low voltage range, and reduced cost is achieved using fewer permanent magnets.

In the seventh aspect of the present invention, according to any one of the first to sixth aspects, when the inductance is measured using the rotor alone, the inductance under load is less than half the inductance under no load. This configuration allows the magnet magnetic flux to be guided to the stator side under load, and the magnet magnetic flux to be short circuited in the rotor under no load. In addition, this configuration achieves a high magnetic flux while improving the effect of suppressing the counter electromotive force under no load, which effect is one of the reasons for using the Lundell-type.

In an eighth aspect of the present invention, according to any one of the first to seventh aspects, the stator core has a plurality of radially extending teeth (23), and the short circuit portion is provided in at least one of a space between the permanent magnet and the field winding and a space between the permanent magnet and the radial end of the teeth. In other words, the short circuit portion is provided between circumferentially arranged claw-shaped magnetic pole portions of different polarities and in a space between the field winding and the teeth in the radial direction, excluding the area of the permanent magnet. This configuration reduces the counter electromotive force. In addition, a very low magneto-resistive counter electromotive force suppressing magnetic path is provided that does not pass through the air gap between the rotor 30 and the stator 20, so that the counter electromotive force can be reduced to about 50% to 70%.

In a ninth aspect of the present invention, according to any one of the first to eighth aspects, the rotor has a core portion (321, 52), and the short circuit portion (35a, 36a, 38) is made of a material having a relative permeability higher than the material of the core portion. This configuration allows the counter electromotive force to be reduced more effectively because the non-magnetic permeability of the short circuit magnetic path having the magnetic flux reducing effect under no load is high.

What is claimed is:

1. A rotating electric machine comprising:
a stator having a stator core to which an armature winding is wound around, and
a rotor disposed on an inner side of the stator so as to face the stator in a radial direction, the rotor including:
a field core having a cylindrical boss portion, and a plurality of claw-shaped magnetic pole portions that are arranged on an outer side of the boss portion and form poles of alternately different polarities in a circumferential direction,
a field winding that is wound around an outer periphery of the boss portion and generates a magnetomotive force by energization,
a permanent magnet disposed between the circumferentially adjacent claw-shaped magnetic pole portions so as the permanent magnet has an easy axis of magnetization oriented in the circumferential direction and has polarity thereof coincide with a polarity of the claw-shaped magnetic pole portions that alternately appears by excitation, and
a magnetic flux short circuit member having a short circuit portion that magnetically connects the claw-shaped magnetic pole portions circumferentially arranged to have different polarities, wherein
the rotor is configured to satisfy $Ab \cdot Bsb + As \cdot Bss \geq 2 \cdot Br \cdot Am$ and $0.03 \leq As/Ab \leq 0.22$, where Ab is an axial cross-sectional area of the boss portion per a pair of NS magnetic poles, Bsb is a magnetic flux density of a material of the boss portion at a magnetic field strength of 5000 A/m, Br is a residual flux density of the permanent magnet, Am is a surface area of the permanent magnet at a magnetic flux inflow/outflow surface, As is a circumferential cross-sectional area of the short circuit portion, and Bss is a magnetic flux density of a material of the short circuit portion at a magnetic field strength of 5000 A/m.

2. The rotating electric machine according to claim 1, wherein
the rotor is configured to satisfy $1 \leq (Ab \cdot Bsb + As \cdot Bss)/(2 \cdot Br \cdot Am) \leq 1.4$.

3. The rotating electric machine according to claim 1, wherein
the short circuit portion has a constant axial cross-sectional area in the circumferential direction.

4. The rotating electric machine according to claim 1, wherein
the short circuit portion has at least a portion thereof protruding axially outward from radially facing surfaces of the rotor and the stator core.

5. A rotating electric machine comprising:
a stator having a stator core to which an armature winding is wound around, and
a rotor disposed on an inner side of the stator so as to face the stator in a radial direction, the rotor including:
a pole core having a cylindrical boss portion, and a disc portion protruding radially outward from both axial ends of the boss portion with a predetermined pitch in a circumferential direction,
a core member having a plurality of magnetic pole portions that are circumferentially arranged and form magnetic poles of alternately different polarities, a q-axis core portion located at a position deviated by 90 electrical degrees from a d-axis passing through the magnetic pole portions, and a short circuit portion that magnetically connects the magnetic pole portions circumferentially arranged to have different polarities,
a field winding that is wound around an outer periphery of the boss portion and generates a magnetomotive force by energization, and
a permanent magnet disposed between the magnetic pole portions and the q-axis core portion so as to have polarity thereof coincide with a polarity of the magnetic pole portions which alternately appears, wherein
the rotor is configured to satisfy $Ab \cdot Bsb + As \cdot Bss \geq 2 \cdot Br \cdot Am$ and $0.03 \leq As/Ab \leq 0.22$, where Ab is an axial cross-sectional area of the boss portion per a pair of NS magnetic poles, Bsb is a magnetic flux density of a material of the boss portion at a magnetic field strength of 5000 A/m, Br is a residual flux density of the permanent magnet, Am is a surface area of the permanent magnet at a magnetic flux inflow/outflow surface, As is a circumferential cross-sectional area of the short circuit portion, and Bss is a magnetic flux density of a material of the short circuit portion at a magnetic field strength of 5000 A/m.

6. The rotating electric machine according to claim 5, wherein
the rotor is configured satisfy $1 \leq (Ab \cdot Bsb + As \cdot Bss)/(2 \cdot Br \cdot Am) \leq 1.4$.

7. The rotating electric machine according to claim 1, wherein
when an inductance is measured using the rotor alone, an inductance under load is less than half an inductance under no load.

8. The rotating electric machine according to claim 5, wherein when an inductance is measured using the rotor alone, an inductance under load is less than half an inductance under no load.

9. The rotating electric machine according to claim 1, wherein the stator core has a plurality of radially extending teeth, and the short circuit portion is provided in at least one of a space between the permanent magnet and the field winding and a space between the permanent magnet and a radial end of the teeth.

10. The rotating electric machine according to claim 5, wherein the stator core has a plurality of radially extending teeth, and the short circuit portion is provided in at least one of a space between the permanent magnet and the field winding and a space between the permanent magnet and a radial end of the teeth.

11. The rotating electric machine according to claim 1, wherein the rotor has a core portion, and the short circuit portion is made of a material having a relative permeability higher than a material of the core portion.

12. The rotating electric machine according to claim 5, wherein the rotor has a core portion, and the short circuit portion is made of a material having a relative permeability higher than a material of the core portion.

* * * * *